United States Patent
Wang et al.

(10) Patent No.: US 12,484,022 B2
(45) Date of Patent: Nov. 25, 2025

(54) COMMUNICATION METHOD AND APPARATUS

(71) Applicant: HUAWEI TECHNOLOGIES CO., LTD., Guangdong (CN)

(72) Inventors: Ting Wang, Shanghai (CN); Hao Tang, Ottawa (CA); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 17/513,891

(22) Filed: Oct. 29, 2021

(65) Prior Publication Data

US 2022/0053462 A1 Feb. 17, 2022

Related U.S. Application Data

(63) Continuation of application No. PCT/CN2020/087061, filed on Apr. 26, 2020.

(30) Foreign Application Priority Data

Apr. 30, 2019 (CN) .......................... 201910365342.6

(51) Int. Cl.
*H04W 72/02* (2009.01)
*H04W 72/044* (2023.01)
(Continued)

(52) U.S. Cl.
CPC ......... *H04W 72/02* (2013.01); *H04W 72/044* (2013.01); *H04W 72/1263* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 9,629,142 B2 | 4/2017 | Zhang et al. | |
| 10,157,539 B1 * | 12/2018 | Hoover | H04W 4/40 |

(Continued)

FOREIGN PATENT DOCUMENTS

| | | |
|---|---|---|
| CN | 105580464 A | 5/2016 |
| CN | 108337659 A | 7/2018 |

(Continued)

OTHER PUBLICATIONS

Huawei, HiSilicon, Sidelink physical layer structure for NR V2X. 3GPP TSG RAN WG1 Meeting #96bis, Xi an, China, Apr. 8-12, 2019, R1-1903943, 17 pages.

(Continued)

*Primary Examiner* — Christopher T Wyllie

(57) ABSTRACT

This application discloses a communication method and apparatus. The method includes receiving by a terminal device a subchannel indication from a network device, and performing sidelink communication on K subchannels based on the subchannel indication. The subchannel indication is used to indicate the K subchannels used for sidelink communication, the K subchannels belong to M resource pools in N resource pools, and the N resource pools are resource pools corresponding to a BWP used for sidelink communication. A quantity of bits of the subchannel indication is determined based on a quantity of subchannels included in a reference resource pool, and the reference resource pool is a resource pool in the N resource pools.

15 Claims, 6 Drawing Sheets

(51) Int. Cl.
*H04W 72/1263* (2023.01)
*H04W 92/18* (2009.01)

(56) References Cited

U.S. PATENT DOCUMENTS

| | | | |
|---|---|---|---|
| 2015/0009949 A1 | 1/2015 | Khoryaev et al. | |
| 2015/0245362 A1 | 8/2015 | Li et al. | |
| 2016/0044619 A1 | 2/2016 | Ryu et al. | |
| 2019/0090250 A1* | 3/2019 | Lee | H04W 72/543 |
| 2019/0190643 A1* | 6/2019 | Lee | H04L 5/0039 |
| 2019/0191461 A1* | 6/2019 | Lee | H04W 72/12 |
| 2020/0029318 A1* | 1/2020 | Guo | H04L 1/1854 |
| 2020/0037343 A1* | 1/2020 | He | H04W 72/20 |
| 2020/0383088 A1* | 12/2020 | Min | H04W 72/0446 |
| 2021/0204284 A1* | 7/2021 | Lin | H04W 72/20 |
| 2021/0219268 A1* | 7/2021 | Li | H04B 17/318 |
| 2021/0306824 A1* | 9/2021 | Li | H04W 72/02 |
| 2021/0368372 A1* | 11/2021 | Chen | H04W 76/30 |
| 2021/0410111 A1* | 12/2021 | Yokomakura | H04L 5/0094 |
| 2022/0053462 A1* | 2/2022 | Wang | H04W 72/044 |
| 2022/0159674 A1* | 5/2022 | Deng | H04W 72/23 |
| 2022/0377708 A1* | 11/2022 | Hwang | H04W 72/044 |

FOREIGN PATENT DOCUMENTS

| | | | | |
|---|---|---|---|---|
| CN | 108616852 A | | 10/2018 | |
| CN | 108886396 A | | 11/2018 | |
| CN | 109219131 A | | 1/2019 | |
| CN | 109644084 A | | 4/2019 | |
| CN | 110958098 A | * | 4/2020 | H04W 72/23 |
| CN | 110958098 B | * | 3/2021 | H04W 72/23 |
| CN | 111867116 B | * | 7/2022 | H04W 72/20 |
| CN | 113543336 B | * | 1/2023 | H04L 1/1887 |
| EP | 3301987 A1 | | 4/2018 | |
| KR | 20200034531 A | * | 3/2020 | H04W 72/04 |
| WO | 2015113213 A1 | | 8/2015 | |
| WO | WO-2017011978 A1 | * | 1/2017 | H04W 88/04 |
| WO | WO-2018177109 A1 | * | 10/2018 | H04W 72/12 |
| WO | 2019059707 A1 | | 3/2019 | |
| WO | WO-2022028328 A1 | * | 2/2022 | H04L 1/1812 |
| WO | WO-2023075976 A1 | * | 5/2023 | H04L 5/0094 |
| WO | WO-2023087150 A1 | * | 5/2023 | H04W 8/24 |

OTHER PUBLICATIONS

Vivo, Discussion on mode 1 resource allocation mechanism. 3GPP TSG RAN WG1 #96bis, Xi an, China, Apr. 8 12, 2019, R1-1904073, 9 pages.
3GPP TS 38.212 V15.5.0 (Mar. 2019), 3rd Generation Partnership Project; Technical Specification Group Radio Access Network; NR; Multiplexing and channel coding(Release 15), 101 pages.
Intel Corporation, Sidelink Physical Structure for NR V2X Communication. 3GPP3GPP TS WG1 RAN1#96bis, Xi an, China, Apr. 8-12, 2019, R1-1904294, 16 pages.
3GPP TS 38.214 V15.5.0 (Mar. 2019), 3rd Generation Partnership Project; Technical Specification Group Radio Access Network; NR; Physical layer procedures for data(Release 15), 103 pages.
3GPP TS 38.213 V15.5.0 (Mar. 2019), 3rd Generation Partnership Project; Technical Specification Group Radio Access Network;NR;Physical layer procedures for control(Release 15), total 104 pages.
3GPP TS 23.287 V0.3.0 (Apr. 2019), 3rd Generation Partnership Project; Technical Specification Group Services and System Aspects; Architecture enhancements for 5G System (5GS) to support Vehicle-to-Everything (V2X) services (Release 16), 39 pages.
3GPP TS 38.321 V15.5.0:"3rd Generation Partnership Project; Technical Specification Group Radio Access Network; NR; Medium Access Control (MAC) protocol specification (Release 15)",Mar. 2019, total 78 pages.
3GPP TS 38.331 V15.5.1 (Apr. 2019), 3rd Generation Partnership Project; Technical Specification Group Radio Access Network;NR-;Radio Resource Control (RRC) protocol specification(Release 15), total 491 pages.
Spreadtrum Communications, Discussion on NR sidelink physical layer structure. 3GPP TSG RAN WG1 Ad-Hoc Meeting 1901, Taipei, Jan. 21-25, 2019, R1-1900713, 10 pages.
ZTE, Sanechips, NR sidelink physical layer structure. 3GPP TSG RAN WG1 #96bis, Xi''an, China, Apr. 8-12, 2019, R1-1904814, 9 pages.

* cited by examiner

COMMUNICATION METHOD AND APPARATUS

CROSS-REFERENCE TO RELATED APPLICATIONS

This application is a continuation of International Application No. PCT/CN2020/087061, filed on Apr. 26, 2020, which claims priority to Chinese Patent Application No. 201910365342.6, filed on Apr. 30, 2019. The disclosures of the aforementioned applications are hereby incorporated by reference in their entireties.

TECHNICAL FIELD

This application relates to the field of communication technologies, and in particular, to a communication method and apparatus.

BACKGROUND

With continuous development of communication technologies, a new radio (new radio, NR) technology is proposed to meet a user's requirement on network bandwidth and rate. In NR, a bandwidth part (bandwidth part, BWP) is introduced. Therefore, a new resource scheduling manner needs to be designed for sidelink communication to meet a requirement of flexible resource scheduling.

SUMMARY

Embodiments of this application provide a communication method and apparatus, to help implement flexible scheduling of a resource used for sidelink communication, and improve transmission performance.

According to a first aspect, an embodiment of this application provides a communication method. The method includes:

A terminal device receives a subchannel indication sent by a network device, where the subchannel indication is used to indicate K subchannels used for sidelink communication, the K subchannels belong to M resource pools in N resource pools, and the N resource pools are resource pools corresponding to a bandwidth part BWP used for sidelink communication, where N is a positive integer greater than 1, $1 \leq M \leq N$, M is a positive integer, and K is a positive integer greater than or equal to 1. A quantity of bits of the subchannel indication is determined based on a quantity of subchannels included in a reference resource pool, and the reference resource pool is a resource pool in the N resource pools. Then, the terminal device performs the sidelink communication on the K subchannels indicated by the subchannel indication.

In this embodiment of this application, the quantity of bits of the subchannel indication may be determined based on the quantity of subchannels included in the reference resource pool. Therefore, when the subchannel indication can flexibly indicate subchannels of one or more resource pools in a plurality of resource pools, understanding of the subchannel indication by the network device and the terminal device can be unified, to help implement flexible scheduling of subchannels in the sidelink communication, and improve transmission performance.

In a possible design, the subchannel indication includes M subchannel subindications respectively corresponding to the M resource pools, and a subchannel subindication corresponding to a resource pool i in the M resource pools is used to indicate a subchannel that belongs to the resource pool i in the K subchannels, where $1 \leq i \leq M$, and i is a positive integer; and a quantity of bits of the subchannel subindication corresponding to the resource pool i is determined based on the quantity of subchannels included in the reference resource pool, and the quantity of bits of the subchannel indication is equal to a sum of quantities of bits of the subchannel subindications corresponding to the M resource pools. This helps simplify implementation.

In a possible design, if a quantity of bits required to indicate the subchannel in the resource pool i is W, the quantity of bits of the subchannel subindication corresponding to the resource pool i is Ri, and W and Ri are positive integers greater than or equal to 1, when W is less than Ri, the terminal device determines, based on W least significant bits in the subchannel subindication corresponding to the resource pool i, the subchannel indicated by the subchannel subindication corresponding to the resource pool i;

when W is less than Ri, the terminal device determines, based on W most significant bits in the subchannel subindication corresponding to the resource pool i, the subchannel indicated by the subchannel subindication corresponding to the resource pool i;

when W is greater than Ri, the terminal device pads the subchannel subindication corresponding to the resource pool i with (W−Ri) 0s before a most significant bit, and determines, based on the subchannel subindication that corresponds to the resource pool i and that is padded with the (W−Ri) 0s, the subchannel indicated by the subchannel subindication corresponding to the resource pool i; or when W is greater than Ri, the terminal device pads the subchannel subindication corresponding to the resource pool i with (W−Ri) 0s after a least significant bit, and determines, based on the subchannel subindication that corresponds to the resource pool i and that is padded with the (W−Ri) 0s, the subchannel indicated by the subchannel subindication corresponding to the resource pool i. This helps unify understanding of the subchannel subindication by the network device and the terminal device when the quantity of bits that are required is different from the quantity of bits of the subchannel subindication, and reduces complexity of determining, by the terminal device, the indicated subchannel based on the subchannel subindication corresponding to the resource pool i.

In a possible design, if a quantity of bits required to indicate the K subchannels is Z, the quantity of bits of the subchannel indication is Y, and Z and Y are positive integers greater than or equal to 1, when Z is less than Y, the terminal device determines the K subchannels based on Z least significant bits in the subchannel indication;

when Z is less than Y, the terminal device determines the K subchannels based on Z most significant bits in the subchannel indication;

when Z is greater than Y, the terminal device pads the subchannel indication with (Z−Y) 0s before a most significant bit, and determines the K subchannels based on the subchannel indication padded with the (Z−Y) 0s; or when Z is greater than Y, the terminal device pads the subchannel indication with (Z−Y) 0s after a least significant bit, and determines the K subchannels based on the subchannel indication padded with the (Z−Y) 0s. The foregoing technical solution helps unify understanding of the subchannel indication by the network device and the terminal device when the quantity of bits that are required is different from the quantity of bits of the subchannel indication. This not only helps reduce signaling overheads of the subchannel indication, but also helps reduce complexity of determining, by the terminal device, the indicated subchannel based on the subchannel indication.

In a possible design, the reference resource pool is a resource pool that includes a largest quantity of subchannels in the N resource pools. This helps increase a quantity of subchannels that can be indicated by the subchannel indication.

In a possible design, the reference resource pool is a resource pool that is in the N resource pools and that is indicated by the network device to the terminal device. This helps increase flexibility, and can unify understanding of the subchannel indication (or the subchannel subindication) by the network device and the terminal device.

In a possible design, the reference resource pool is determined based on identifiers of the N resource pools. This helps increase flexibility, and can unify understanding of the subchannel indication (or the subchannel subindication) by the network device and the terminal device.

In a possible design, the reference resource pool is a resource pool to which a subchannel indicated by a previous subchannel indication belongs, and the previous subchannel indication is a subchannel indication last received before the terminal device receives the subchannel indication. This helps simplify implementation, and can unify understanding of the subchannel indication (or the subchannel subindication) by the network device and the terminal device.

In a possible design, the N resource pools are resource pools corresponding to an overlapping resource between the BWP used for sidelink communication and a BWP used for uplink communication; or the N resource pools are resource pools corresponding to a resource that is in the BWP used for sidelink communication and that is used in a network device scheduling mode.

In a possible design, the terminal device receives a resource pool indication sent by the network device, where the resource pool indication is used to indicate the M resource pools to which the K subchannels belong, and a quantity of bits of the resource pool indication is determined based on N and/or M. In this way, understanding of the resource pool indication by the network device and the terminal device can be unified to help improve transmission performance, and resource pool selection and scheduling can be flexibly implemented to improve resource utilization.

According to a second aspect, an embodiment of this application provides a communication method. The method includes:

A network device determines K subchannels used for sidelink communication, and then sends a subchannel indication to a terminal device, where the K subchannels belong to M resource pools in N resource pools, and the N resource pools are resource pools corresponding to a bandwidth part BWP used for sidelink communication, where N is a positive integer greater than 1, 1≤M≤N, M is a positive integer, and K is a positive integer greater than or equal to 1; and the subchannel indication is used to indicate the K subchannels used for sidelink communication, a quantity of bits of the subchannel indication is determined based on a quantity of subchannels included in a reference resource pool, and the reference resource pool is a resource pool in the N resource pools.

In this embodiment of this application, the quantity of bits of the subchannel indication may be determined based on the quantity of subchannels included in the reference resource pool. Therefore, when the subchannel indication can flexibly indicate subchannels of one or more resource pools in a plurality of resource pools, understanding of the subchannel indication by the network device and the terminal device can be unified, to help implement flexible scheduling of subchannels in the sidelink communication, and improve transmission performance.

In a possible design, the subchannel indication includes M subchannel subindications respectively corresponding to the M resource pools, and a subchannel subindication corresponding to a resource pool i in the M resource pools is used to indicate a subchannel that belongs to the resource pool i in the K subchannels, where 1≤i≤M, and i is a positive integer; and a quantity of bits of the subchannel subindication corresponding to the resource pool i is determined based on the quantity of subchannels included in the reference resource pool, and the quantity of bits of the subchannel indication is equal to a sum of quantities of bits of the subchannel subindications corresponding to the M resource pools. This helps simplify implementation.

In a possible design, if a quantity of bits required to indicate the subchannel in the resource pool i is W, the quantity of bits of the subchannel subindication corresponding to the resource pool i is Ri, and W and Ri are positive integers greater than or equal to 1, when W is less than Ri, the network device pads the W bits required to indicate the subchannel in the resource pool i with (Ri−W) 0s before a most significant bit, to obtain the subchannel subindication corresponding to the resource pool i;

when W is less than Ri, the network device pads the W bits required to indicate the subchannel in the resource pool i with (Ri−W) 0s after a least significant bit, to obtain the subchannel subindication corresponding to the resource pool i;

when W is greater than Ri, the network device intercepts Ri most significant bits from the W bits required to indicate the subchannel in the resource pool i, to obtain the subchannel subindication corresponding to the resource pool i; or when W is greater than Ri, the network device intercepts Ri least significant bits from the W bits required to indicate the subchannel in the resource pool i, to obtain the subchannel subindication corresponding to the resource pool i. This helps unify understanding of the subchannel subindication by the network device and the terminal device when the quantity of bits that are required is different from the quantity of bits of the subchannel subindication, and reduces complexity of obtaining, by the network device, the subchannel subindication corresponding to the resource pool i.

In a possible design, if a quantity of bits required to indicate the K subchannels is Z, the quantity of bits of the subchannel indication is Y, and Z and Y are positive integers greater than or equal to 1, when Z is less than Y, the network device pads the Z bits required to indicate the K subchannels with (Y−Z) 0s before a most significant bit, to obtain the subchannel indication;

when Z is less than Y, the network device pads the Z bits required to indicate the K subchannels with (Y−Z) 0s after a least significant bit, to obtain the subchannel indication;

when Z is greater than Y, the network device intercepts Y most significant bits from the Z bits required to indicate the K subchannels, to obtain the subchannel indication; or when Z is greater than Y, the network device intercepts Y least significant bits from the Z bits required to indicate the K subchannels, to obtain the subchannel indication. The foregoing technical solution helps unify understanding of the subchannel indication by the network device and the terminal device when the quantity of bits that are required is different from the quantity of bits of the subchannel indication. This not only helps reduce signaling overheads of the subchannel indication, but also helps reduce complexity of obtaining the subchannel indication by the network device.

In a possible design, the reference resource pool is a resource pool that includes a largest quantity of subchannels in the N resource pools. This helps increase a quantity of subchannels that can be indicated by the subchannel indication.

In a possible design, the reference resource pool is a resource pool that is in the N resource pools and that is indicated by the network device to the terminal device. This helps increase flexibility, and can unify understanding of the subchannel indication (or the subchannel subindication) by the network device and the terminal device.

In a possible design, the reference resource pool is determined based on identifiers of the N resource pools. This helps increase flexibility, and can unify understanding of the subchannel indication (or the subchannel subindication) by the network device and the terminal device.

In a possible design, the reference resource pool is a resource pool to which a subchannel indicated by a previous subchannel indication belongs, and the previous subchannel indication is a subchannel indication last sent before the network device sends the subchannel indication. This helps simplify implementation, and can unify understanding of the subchannel indication (or the subchannel subindication) by the network device and the terminal device.

In a possible design, the N resource pools are resource pools corresponding to an overlapping resource between the BWP used for sidelink communication and a BWP used for uplink communication; or the N resource pools are resource pools corresponding to a resource that is in the BWP used for sidelink communication and that is used in a network device scheduling mode.

In a possible design, the network device sends a resource pool indication to the terminal device, where the resource pool indication is used to indicate the M resource pools to which the K subchannels belong, and a quantity of bits of the resource pool indication is determined based on N and/or M. In this way, understanding of the resource pool indication by the network device and the terminal device can be unified to help improve transmission performance, and resource pool selection and scheduling can be flexibly implemented to improve resource utilization.

According to a third aspect, this application provides a communication apparatus. The communication apparatus may be a terminal device, an apparatus in the terminal device, or an apparatus that can be used in coordination with the terminal device. The apparatus may include a processing module and a transceiver module. In addition, the processing module and the transceiver module may perform corresponding functions in the method according to any one of the first aspect or the designs of the first aspect. Details are as follows:

The transceiver module is configured to receive a subchannel indication sent by a network device. The processing module is configured to trigger and/or control the transceiver module to perform sidelink communication on K subchannels indicated by the subchannel indication.

The subchannel indication is used to indicate the K subchannels used for sidelink communication, the K subchannels belong to M resource pools in N resource pools, and the N resource pools are resource pools corresponding to a bandwidth part BWP used for sidelink communication, where N is a positive integer greater than 1, $1 \leq M \leq N$, M is a positive integer, and K is a positive integer greater than or equal to 1. A quantity of bits of the subchannel indication is determined based on a quantity of subchannels included in a reference resource pool, and the reference resource pool is a resource pool in the N resource pools.

In a possible design, the subchannel indication includes M subchannel subindications respectively corresponding to the M resource pools, and a subchannel subindication corresponding to a resource pool i in the M resource pools is used to indicate a subchannel that belongs to the resource pool i in the K subchannels, where $1 \leq i \leq M$, and i is a positive integer; and a quantity of bits of the subchannel subindication corresponding to the resource pool i is determined based on the quantity of subchannels included in the reference resource pool, and the quantity of bits of the subchannel indication is equal to a sum of quantities of bits of the subchannel subindications corresponding to the M resource pools.

In a possible design, if a quantity of bits required to indicate the subchannel in the resource pool i is W, the quantity of bits of the subchannel subindication corresponding to the resource pool i is Ri, and W and Ri are positive integers greater than or equal to 1, the processing module is further configured to:

when W is less than Ri, determine, based on W least significant bits in the subchannel subindication corresponding to the resource pool i, the subchannel indicated by the subchannel subindication corresponding to the resource pool i;

when W is less than Ri, determine, based on W most significant bits in the subchannel subindication corresponding to the resource pool i, the subchannel indicated by the subchannel subindication corresponding to the resource pool i;

when W is greater than Ri, pad the subchannel subindication corresponding to the resource pool i with (W−Ri) 0s before a most significant bit, and determine, based on the subchannel subindication that corresponds to the resource pool i and that is padded with the (W−Ri) 0s, the subchannel indicated by the subchannel subindication corresponding to the resource pool i; or when W is greater than Ri, pad the subchannel subindication corresponding to the resource pool i with (W−Ri) 0s after a least significant bit, and determine, based on the subchannel subindication that corresponds to the resource pool i and that is padded with the (W−Ri) 0s, the subchannel indicated by the subchannel subindication corresponding to the resource pool i.

In a possible design, if a quantity of bits required to indicate the K subchannels is Z, the quantity of bits of the subchannel indication is Y, and Z and Y are positive integers greater than or equal to 1, the processing module is further configured to:

when Z is less than Y, determine the K subchannels based on Z least significant bits in the subchannel indication;

when Z is less than Y, determine the K subchannels based on Z most significant bits in the subchannel indication;

when Z is greater than Y, pad the subchannel indication with (Z−Y) 0s before a most significant bit, and determine the K subchannels based on the subchannel indication padded with the (Z−Y) 0s; or when Z is greater than Y, pad the subchannel indication with (Z−Y) 0s after a least significant bit, and determine the K subchannels based on the subchannel indication padded with the (Z−Y) 0s.

In a possible design, the reference resource pool is a resource pool that includes a largest quantity of subchannels in the N resource pools.

In a possible design, the reference resource pool is a resource pool that is in the N resource pools and that is indicated by the network device to the communication apparatus.

In a possible design, the reference resource pool is determined based on identifiers of the N resource pools.

In a possible design, the reference resource pool is a resource pool to which a subchannel indicated by a previous subchannel indication belongs, and the previous subchannel indication is a subchannel indication last received before the transceiver module receives the subchannel indication.

In a possible design, the N resource pools are resource pools corresponding to an overlapping resource between the BWP used for sidelink communication and a BWP used for uplink communication; or the N resource pools are resource pools corresponding to a resource that is in the BWP used for sidelink communication and that is used in a network device scheduling mode.

In a possible design, the transceiver module is further configured to receive a resource pool indication sent by the network device, where the resource pool indication is used to indicate the M resource pools to which the K subchannels belong, and a quantity of bits of the resource pool indication is determined based on N and/or M.

According to a fourth aspect, this application provides a communication apparatus. The communication apparatus may be a terminal device, an apparatus in the terminal device, or an apparatus that can be used in coordination with the terminal device. The apparatus may include a processing module and a transceiver module. In addition, the processing module and the transceiver module may perform corresponding functions in the method according to any one of the second aspect or the designs of the second aspect. Details are as follows:

The processing module is configured to determine K subchannels used for sidelink communication, and the transceiver module is configured to send a subchannel indication to a terminal device, where the K subchannels belong to M resource pools in N resource pools, and the N resource pools are resource pools corresponding to a bandwidth part BWP used for sidelink communication, where N is a positive integer greater than 1, 1≤M≤N, M is a positive integer, and K is a positive integer greater than or equal to 1; and the subchannel indication is used to indicate the K subchannels used for sidelink communication, a quantity of bits of the subchannel indication is determined based on a quantity of subchannels included in a reference resource pool, and the reference resource pool is a resource pool in the N resource pools.

In a possible design, the subchannel indication includes M subchannel subindications respectively corresponding to the M resource pools, and a subchannel subindication corresponding to a resource pool i in the M resource pools is used to indicate a subchannel that belongs to the resource pool i in the K subchannels, where 1≤i≤M, and i is a positive integer; and a quantity of bits of the subchannel subindication corresponding to the resource pool i is determined based on the quantity of subchannels included in the reference resource pool, and the quantity of bits of the subchannel indication is equal to a sum of quantities of bits of the subchannel subindications corresponding to the M resource pools.

In a possible design, if a quantity of bits required to indicate the subchannel in the resource pool i is W, the quantity of bits of the subchannel subindication corresponding to the resource pool i is Ri, and W and Ri are positive integers greater than or equal to 1, the processing module is further configured to:

when W is less than Ri, pad the W bits required to indicate the subchannel in the resource pool i with (Ri−W) 0s before a most significant bit, to obtain the subchannel subindication corresponding to the resource pool i;

when W is less than Ri, pad the W bits required to indicate the subchannel in the resource pool i with (Ri−W) 0s after a least significant bit, to obtain the subchannel subindication corresponding to the resource pool i;

when W is greater than Ri, intercept Ri most significant bits from the W bits required to indicate the subchannel in the resource pool i, to obtain the subchannel subindication corresponding to the resource pool i; or when W is greater than Ri, intercept Ri least significant bits from the W bits required to indicate the subchannel in the resource pool i, to obtain the subchannel subindication corresponding to the resource pool i.

In a possible design, if a quantity of bits required to indicate the K subchannels is Z, the quantity of bits of the subchannel indication is Y, and Z and Y are positive integers greater than or equal to 1, the processing module is further configured to:

when Z is less than Y, pad the Z bits required to indicate the K subchannels with (Y−Z) 0s before a most significant bit, to obtain the subchannel indication;

when Z is less than Y, pad the Z bits required to indicate the K subchannels with (Y−Z) 0s after a least significant bit, to obtain the subchannel indication;

when Z is greater than Y, intercept Y most significant bits from the Z bits required to indicate the K subchannels, to obtain the subchannel indication; or when Z is greater than Y, intercept Y least significant bits from the Z bits required to indicate the K subchannels, to obtain the subchannel indication.

In a possible design, the reference resource pool is a resource pool that includes a largest quantity of subchannels in the N resource pools.

In a possible design, the reference resource pool is a resource pool that is in the N resource pools and that is indicated by the communication apparatus to the terminal device.

In a possible design, the reference resource pool is determined based on identifiers of the N resource pools.

In a possible design, the reference resource pool is a resource pool to which a subchannel indicated by a previous subchannel indication belongs, and the previous subchannel indication is a subchannel indication last sent before the communication apparatus sends the subchannel indication.

In a possible design, the N resource pools are resource pools corresponding to an overlapping resource between the BWP used for sidelink communication and a BWP used for uplink communication; or the N resource pools are resource pools corresponding to a resource that is in the BWP used for sidelink communication and that is used in a network device scheduling mode.

In a possible design, the transceiver module is further configured to send a resource pool indication to the terminal device, where the resource pool indication is used to indicate the M resource pools to which the K subchannels belong, and a quantity of bits of the resource pool indication is determined based on N and/or M.

According to a fifth aspect, an embodiment of this application provides a communication apparatus. The communication apparatus includes a processor, configured to implement the method described in the first aspect. The communication apparatus may further include a memory, configured to store instructions and data. The memory is coupled to the processor. When the processor executes the program instructions stored in the memory, the method described in the first aspect and/or the second aspect can be implemented. The communication apparatus may further include a communication interface. The communication interface is used by the apparatus to communicate with another device. For example, the communication interface may be a transceiver, a circuit, a bus, a module, or a communication interface of another type. The another device may be a network device, a terminal device, or the like.

In a possible design, the communication apparatus includes:

a memory, configured to store program instructions; and a processor, configured to invoke the instructions stored in the memory, to enable the apparatus to perform the method according to any one of the first aspect or the possible designs of the first aspect of the embodiments of this application, or enable the apparatus to perform the method according to any one of the second aspect or the possible designs of the second aspect of the embodiments of this application.

According to a sixth aspect, an embodiment of this application further provides a computer-readable storage medium, including instructions. When the instructions are run on a computer, the computer is enabled to perform the method according to any one of the first aspect or the possible designs of the first aspect, or the method according to any one of the second aspect or the possible designs of the second aspect.

According to a seventh aspect, an embodiment of this application further provides a chip system. The chip system includes a processor, and may further include a memory, configured to implement the method according to any one of the first aspect or the possible designs of the first aspect, or the method according to any one of the second aspect or the possible designs of the second aspect. The chip system may include a chip, or may include a chip and another discrete component.

According to an eighth aspect, an embodiment of this application further provides a computer program product, including instructions. When the instructions are run on a computer, the computer is enabled to perform the method according to any one of the first aspect or the possible designs of the first aspect, or the method according to any one of the second aspect or the possible designs of the second aspect.

In addition, for technical effects brought by any possible design manner in the third aspect to the eighth aspect, refer to technical effects brought by different design manners in the method part. Details are not described herein again.

DESCRIPTION OF EMBODIMENTS

Figure 1A:
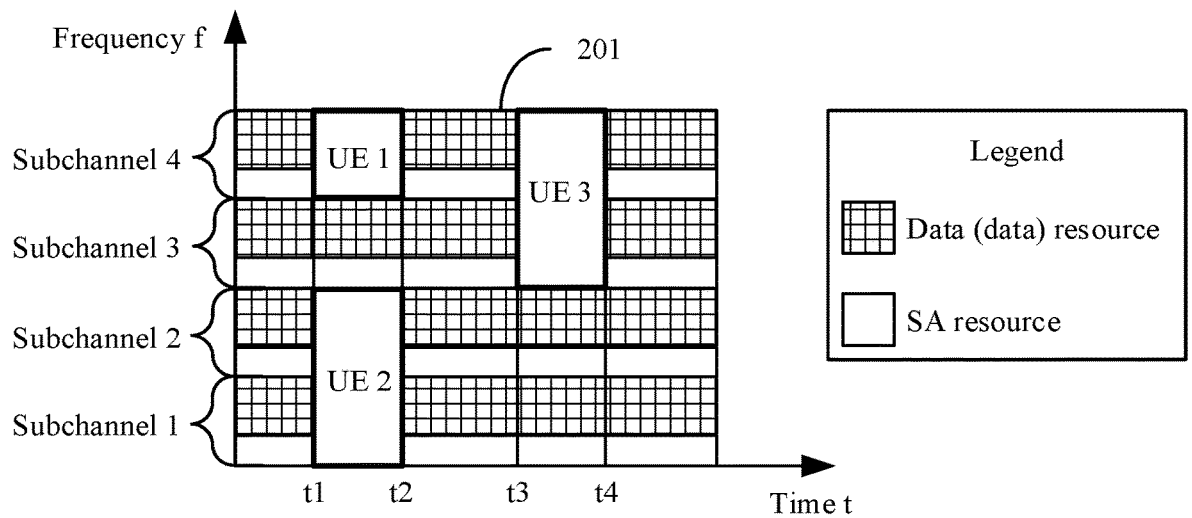
FIG. 1a is a schematic diagram of a subchannel according to an embodiment of this application.

In the embodiments of this application, "at least one" means one or more, and "a plurality of" means two or more than two. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between associated objects. "At least one piece (item) of the following" or a similar expression thereof means any combination of these items, including any combination of a singular item (piece) or plural items (pieces). For example, at least one (piece) of a, b, or c may represent a, b, c, a and b, a and c, b and c, or a, b, and c, where each of a, b, and c may be an element, or may be a set including one or more elements.

In this application, the term "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In this application, "of (of)", "corresponding (corresponding, relevant)", and "corresponding to (corresponding)" may be interchangeably used sometimes. It should be noted that meanings expressed by the terms are consistent when a difference between the terms is not emphasized. In the embodiments of this application, communication and transmission may be interchangeably used sometimes. It should be noted that meanings expressed by the terms are consistent when a difference is not emphasized. For example, transmission may include sending and/or receiving, and may be a noun or a verb.

It should be noted that, in the embodiments of this application, the terms "first", "second", and the like are only used for a purpose of description, but should not be understood as an indication or implication of relative importance or an indication or implication of a sequence.

The following explains and describes some terms in the embodiments in this application, to facilitate understanding by a person skilled in the art.

1. Terminal Device

In the embodiments of this application, the terminal device is a device with a wireless transceiver function, and may be referred to as a terminal (terminal), user equipment (user equipment, UE), a mobile station (mobile station, MS), a mobile terminal (mobile terminal, MT), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. A location of the terminal device may be fixed or mobile. It should be noted that the terminal device may support at least one wireless communication technology, for example, long term evolution (long term evolution, LTE), NR, and wideband code division multiple access (wideband code division multiple access, WCDMA). For example, the terminal device may be a mobile phone (mobile phone), a tablet computer (pad), a desktop computer, a notebook computer, an all-in-one computer, a vehicle-mounted terminal, a virtual reality (virtual reality, VR) terminal device, an augmented reality (augmented reality, AR) terminal device, a wireless terminal in industrial control (industrial control), a wireless terminal in self driving (self driving), a wireless terminal in remote surgery (remote surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a wearable device, a terminal device in a future mobile communication network, a terminal device in a future evolved public land mobile network (public land mobile network, PLMN), or the like. For another example, the terminal device in the embodiments of this application may alternatively be an apparatus having a transceiver function, for example, a chip system. The chip system may include a chip, and may further include another discrete component. In some embodiments, the terminal device may communicate with a network device by using a smart card. The smart card may be configured to store user-related information (for example, a phone number or user identity information). For example, the smart card may be a subscriber identification module (subscriber identification module, SIM) card, a nano-SIM card, a micro-SIM card, an embedded-SIM (embedded-SIM, eSIM) card, or the like. One or more smart cards may be configured for the terminal device in the embodiments of this application, and types of the configured smart cards may be the same or different. For example, one nano-SIM card and one eSIM card are configured for the terminal device. It should be noted that, in the embodiments of this application, the smart card may be embedded in the terminal device and cannot be separated from the terminal device, or may be separated from the terminal device. It should be noted that, in the embodiments of this application, the terminal device may alternatively implement communication with the network device in another manner. This is not limited.

2. Network Device

In the embodiments of this application, the network device is a device that provides a wireless access function for a terminal device, and may also be referred to as an access network device, a radio access network (radio access network, RAN) device, or the like. The network device may support at least one wireless communication technology, such as LTE, NR, or WCDMA. For example, the network device includes but is not limited to: a next-generation NodeB (generation NodeB, gNB) in a fifth-generation mobile communication system (5th-generation, 5G), an evolved NodeB (evolved node B, eNB), a radio network controller (radio network controller, RNC), a NodeB (node B, NB), a base station controller (base station controller, BSC), a base transceiver station (base transceiver station, BTS), a home base station (for example, home evolved node B or home node B, HNB), a baseband unit (baseband unit, BBU), a transmission reception point (transmitting reception point, TRP), a transmission point (transmission point, TP), a mobile switching center, a small cell, and a pico cell. The network device may alternatively be a radio controller, a centralized unit (centralized unit, CU), and/or a distributed unit (distributed unit, DU) in a cloud radio access network (cloud radio access network, CRAN) scenario. Alternatively, the network device may be a relay station, an access point, a vehicle-mounted device, a terminal device, a wearable device, a network device in future mobile communication, a network device in a future evolved PLMN, or the like. In some embodiments, the network device may alternatively be an apparatus, for example, a chip system, that provides a wireless communication function for the terminal device. For example, the chip system may include a chip, and may further include another discrete component.

3. Network Management System (Network Management System)

The network management system in the embodiments of this application may be referred to as a network management system for short, and is a system configured to adjust a network status in combination with software and hardware, and may be used to ensure normal and efficient running of a network, to achieve better utilization of a network resource. The network resource may be a resource such as hardware, software, and a provided service in a network. It should be noted that the network management system in the embodiments of this application may be integrated into a network device, or may be a physically independent device.

4. Sidelink (Sidelink) Communication

In the embodiments of this application, the sidelink communication refers to communication between terminal devices, and may also be referred to as sidelink transmission, including sending and/or receiving of a sidelink signal. The sidelink signal is a signal transmitted between the terminal devices in the sidelink communication, and may also be referred to as sidelink information or the like. For example, the sidelink signal may include sidelink control information (sidelink control information, SCI) and/or sidelink data (sidelink data). The SCI may be related information used for sidelink data scheduling, for example, information about resource allocation of a data channel and a modulation and coding scheme (modulation and coding scheme, MCS). In the embodiments of this application, the SCI may also be referred to as a sidelink scheduling assignment (sidelink scheduling assignment, SL SA). Specifically, the SCI may be carried on a physical sidelink control channel (physical sidelink control channel, PSCCH), and the sidelink data may be carried on a physical sidelink shared channel (physical sidelink shared channel, PSSCH). For another example, the sidelink signal may further include sidelink feedback control information (sidelink feedback control information, SFCI), which may be referred to as sidelink feedback information or sidelink uplink control information (sidelink uplink control information, SL UCI). The SFCI may include one or more pieces of information such as channel state information (channel state information, CSI) and hybrid automatic repeat request (hybrid automatic repeat request, HARQ) information. The HARQ information may include acknowledgment information (acknowledgment, ACK), negative acknowledgment information (negative acknowledgment, NACK), or the like. Specifically, the SFCI may be carried on a physical sidelink feedback channel (physical sidelink feedback channel, PSFCH). The PSFCH may also be referred to as a sidelink feedback channel or a physical sidelink uplink control channel (physical sidelink uplink control channel, PSUCH).

5. Communication Between a Terminal Device and a Network Device

In the embodiments of this application, the terminal device and the network device communicate with each other through a communication interface. For example, the communication interface between the terminal device and the network device may be a universal UE to network interface (universal UE to network interface, Uu air interface). When the communication interface between the terminal device and the network device is the Uu air interface, the communication between the terminal device and the network device may also be referred to as Uu air interface communication.

6. Uplink Communication

The uplink communication in the embodiments of this application may also be referred to as uplink transmission, and refers to a process in which a terminal device sends a signal to a network device in communication between the terminal device and the network device. The signal sent by the terminal device to the network device may be referred to as an uplink signal or uplink information. For example, the uplink signal includes uplink control information (uplink control information, UCI) and uplink data. The uplink control information is used to carry related information fed back by the terminal device, for example, channel state information (channel state information, CSI) and an acknowledgment (acknowledgment, ACK)/a negative acknowledgment (negative acknowledgment, NACK). Specifically, the uplink control information may be carried on a physical uplink control channel (physical uplink control channel, PUCCH), and the uplink data may be carried on a physical uplink shared channel (physical uplink shared channel, PUSCH).

7. Downlink Communication

The downlink communication in the embodiments of this application may also be referred to as downlink transmission, and refers to a process in which a terminal device receives a signal sent by a network device in communication between the terminal device and the network device. The signal sent by the network device and received by the terminal device may be referred to as a downlink signal or downlink information. For example, the downlink signal may include downlink control information (downlink control information, DCI) and downlink data (downlink data). The downlink control information is related information used for downlink data scheduling, for example, information about resource allocation of a data channel and a modulation and coding scheme. Specifically, the downlink control information may be carried on a physical downlink control channel (physical downlink control channel, PDCCH), and the downlink data may be carried on a physical downlink shared channel (physical downlink shared channel, PDSCH).

8. Resource Pool (Resource Pool, RP)

In the embodiments of this application, the resource pool refers to a group of resources used for sidelink communication. From dimensions of time domain and frequency domain, the resource pool may include a time domain resource pool and a frequency domain resource pool. For example, the time domain resource pool may be referred to as a time unit pool, and communication such as sidelink communication or Uu air interface communication is performed in a unit of time unit. For example, the time unit may be a radio frame (radio frame), a subframe (subframe), a slot (slot), a micro-slot (micro-slot), a mini-slot (mini-slot), a symbol, or the like. For example, the time unit is a subframe, and the time domain resource pool may be referred to as a subframe pool. For another example, the time unit is a slot, and the time domain resource pool may be referred to as a slot pool. For still another example, the time unit is a symbol, and the time domain resource pool may be referred to as a symbol pool. From a dimension of sending and receiving a sidelink signal, the resource pool may include a sending resource pool (transmission pool) and a receiving resource pool (reception pool). The sending resource pool is used to send a sidelink signal, and the receiving resource pool is used to receive a sidelink signal. Specifically, in the embodiments of this application, the sending resource pool and the receiving resource pool may be a same time-frequency resource, or may be different time-frequency resources. This is not limited. From a dimension of an information type included in the sidelink signal, the resource pool may include a resource used to transmit SCI and a resource used to transmit sidelink data.

In the following, for ease of description, the resource used to transmit SCI is referred to as an SA resource for short, and the resource used to transmit sidelink data is referred to as a data resource for short. It may be understood that in the embodiments of this application, the SA resource and the data resource may be adjacent or non-adjacent in frequency domain.

For example, when the SA resource and the data resource are adjacent, the resource pool may be shown in FIG. 1a. A resource pool 201 shown in FIG. 1a includes four subchannels (sub-channel). Each subchannel includes a data resource and an SA resource. Specifically, a location of the SA resource in the subchannel may be predefined in a protocol. For example, the following may be predefined in a protocol: When the data resource and the SA resource are adjacent, a location of the SA resource in the subchannel may be two bottommost RBs in the subchannel. In some embodiments, when sending a sidelink signal by using two or more subchannels in the resource pool, a terminal device usually sends SCI on an SA resource of a bottommost subchannel of the two or more subchannels. With reference to the resource pool 201 shown in FIG. 1a, an example in which terminal devices are UE 1, UE 2, and UE 3 is used.

For example, the UE 1 sends a sidelink signal on a subchannel 4 between a moment t1 and a moment t2. Specifically, the UE 1 sends sidelink data on a data resource of the subchannel 4 and sends SCI on an SA resource of the subchannel 4 between the moment t1 and the moment t2. For another example, the UE 2 sends a sidelink signal on a subchannel 1 and a subchannel 2 between the moment t1 and the moment t2. Specifically, the UE 2 sends sidelink data on data resources of the subchannel 2 and the subchannel 1 and sends SCI on an SA resource of the subchannel 1 between the moment t1 and the moment t2. For still another example, the UE 3 sends a sidelink signal on a subchannel 3 and the subchannel 4 between a moment t3 and a moment t4. Specifically, the UE 3 sends sidelink data on data resources of the subchannel 4 and the subchannel 3 and sends SCI on an SA resource of the subchannel 3 between the moment t3 and the moment t4.

Figure 1B:
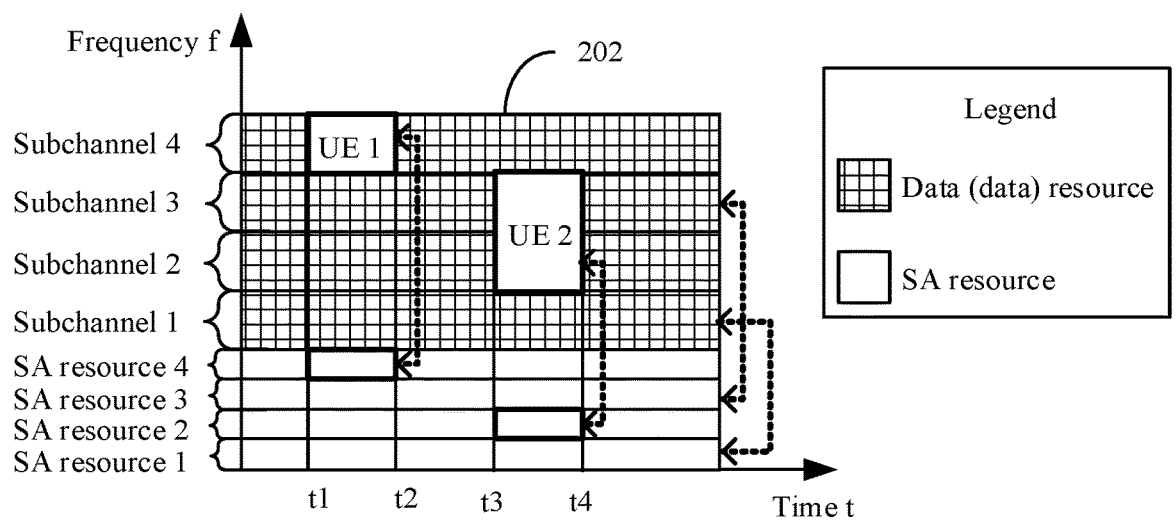
FIG. 1b is a schematic diagram of another subchannel according to an embodiment of this application.

For example, when the SA resource and the data resource are not adjacent, the resource pool may be shown in FIG. 1b. The resource pool 202 shown in FIG. 1b includes four subchannels and SA resources respectively corresponding to the four subchannels. It should be noted that, when the SA resource is not adjacent to the data resource, a size of the SA resource and a correspondence or an association relationship between the subchannel and the SA resource may be predefined in a protocol. For example, in the resource pool 202 shown in FIG. 1b, a subchannel 1 corresponds to an SA resource 1, a subchannel 2 corresponds to an SA resource 2, a subchannel 3 corresponds to an SA resource 3, and a subchannel 4 corresponds to an SA resource 4. In some embodiments, when sending a sidelink signal by using two or more subchannels in the resource pool, a terminal device usually sends SCI on an SA resource corresponding to a bottommost subchannel of the two or more subchannels. With reference to the resource pool 202 shown in FIG. 1b, an example in which terminal devices are UE 1 and UE 2 is used. For example, when the UE 1 sends sidelink data on a subchannel 4 between a moment t1 and a moment t2, the UE 1 sends SCI on an SA resource 4 between the moment t1 and the moment t2. For another example, when the UE 2 sends sidelink data on a subchannel 2 and a subchannel 3 between a moment t3 and a moment t4, the UE 2 sends SCI on an SA resource 2 corresponding to the subchannel 2 between the moment t1 and the moment t2.

9. BWP

Figure 2:
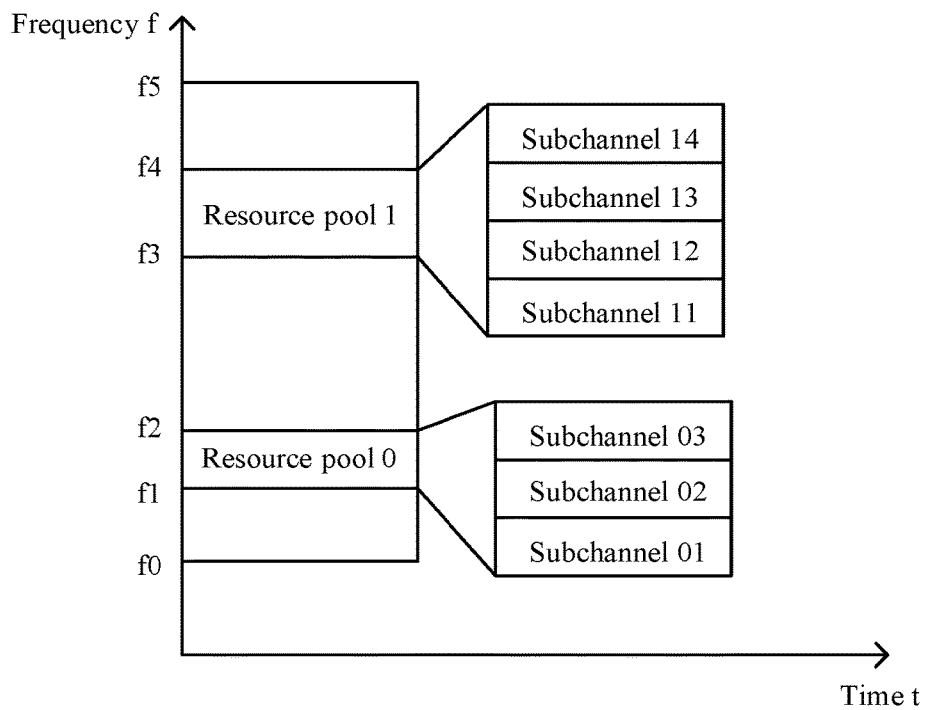
FIG. 2 is a schematic diagram of a resource pool according to an embodiment of this application.

In the embodiments of this application, the BWP may also be referred to as a carrier bandwidth part, and refers to a segment of continuous or discontinuous frequency domain resources on a carrier. A bandwidth of the segment of continuous or discontinuous frequency domain resources may not exceed a bandwidth capability of a terminal device or may exceed a bandwidth capability of the terminal device. This is not limited in this application. It should be noted that the bandwidth capability of the terminal device is used to indicate a maximum bandwidth supported by the terminal device. An example in which the BWP is a segment of continuous frequency domain resources on a carrier is used. The BWP may be a group of continuous resource blocks (resource block, RB) on the carrier, a group of continuous subcarriers on the carrier, a group of continuous resource block groups (resource block group, RBG) on the carrier, or the like. One RBG includes at least one RB, for example, one, two, four, six, or eight RBs, and one RB may include at least one subcarrier, for example, 12 subcarriers. In some embodiments, a BWP used for sidelink communication may be configured by a network device or an operator. For ease of description, the BWP used for sidelink communication may be referred to as a sidelink BWP (sidelink BWP, SL BWP) for short in the following. Specifically, the network device or the operator may configure an SL BWP for the terminal device, and configure one or more resource pools in the SL BWP. Each resource pool may include one or more subchannels. In addition, quantities of subchannels included in the resource pools may be the same or different. For example, as shown in FIG. 2, the SL BWP configured by the network device for the terminal device is a frequency domain resource between a frequency f0 and a frequency f5, and resource pools configured in the frequency domain resource between the frequency f0 and the frequency f5 are a resource pool 1 and a resource pool 0. A frequency domain resource of the resource pool 1 is a frequency domain resource between a frequency f3 and a frequency f4 in the SL BWP, and a frequency domain resource of the resource pool 0 is a frequency domain resource between a frequency f1 and a frequency f2 in the SL BWP. The resource pool 1 includes a subchannel 11, a subchannel 12, a subchannel 13, and a subchannel 14, and the resource pool 0 includes a subchannel 01, a subchannel 02, and a subchannel 03. For example, the network device may send resource configuration signaling to the terminal device, to indicate the SL BWP to the terminal device, and indicate one or more resource pools configured in the SL BWP. Specifically, the resource configuration signaling may be higher layer signaling, such as RRC signaling such as common radio resource control (radio resource control, RRC) signaling and UE-specific RRC signaling, system information (for example, a system information block (system information block, SIB)), broadcast information, or the like. It should be noted that the common RRC signaling may be received by a plurality of terminal devices, for example, cell-level RRC signaling, and the UE-specific RRC signaling is UE-level RRC signaling and is usually received by only one terminal device. For another example, the operator may preconfigure the SL BWP and one or more resource pools in the SL BWP by using a SIM card. In some other embodiments, the SL BWP and the one or more resource pools configured in the SL BWP may alternatively be preconfigured in a communication protocol. It should be noted that one or more SL BWPs may be configured for one terminal device, and one or more resource pools may be configured in each SL BWP.

In addition, in the embodiments of this application, a BWP used in communication (for example, uplink communication or downlink communication) between the terminal device and the network device is usually configured by the network device. A BWP used in uplink communication may be referred to as a BWP used for uplink communication, or may be referred to as an uplink BWP (uplink BWP, UL BWP) for short. A BWP used in downlink communication may be referred to as a BWP used for the downlink communication, or may be referred to as a downlink BWP (downlink BWP, DL BWP) for short. It should be noted that the network device may configure, for the terminal device, one or more BWPs used for uplink communication and/or downlink communication.

Figure 3A:
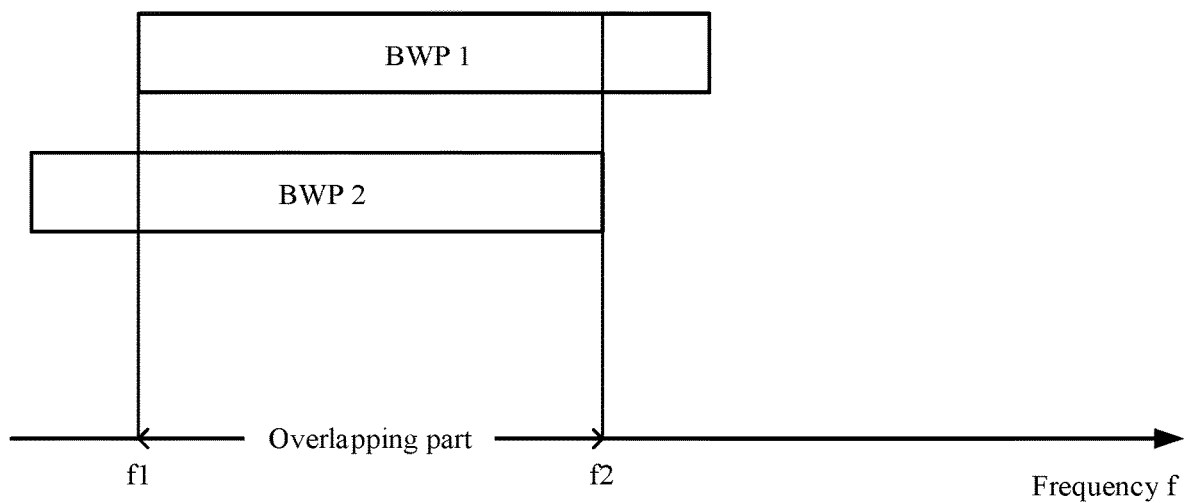
FIG. 3a is a schematic diagram of overlapping between some resources of a BWP 1 and a BWP 2 according to an embodiment of this application.
Figure 3B:
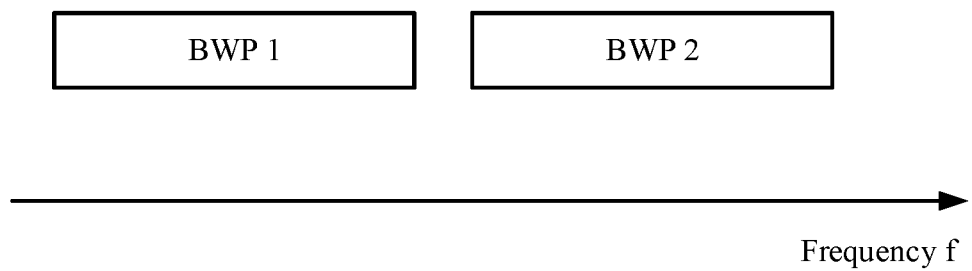
FIG. 3b is a schematic diagram of non-overlapping between resources of a BWP 1 and a BWP 2 according to an embodiment of this application.

For example, a BWP 1 and a BWP 2 are BWPs configured for one terminal device, the BWP 1 is used for sidelink communication, the BWP 2 is used for uplink communication, and the BWP 1 and the BWP 2 may overlap (for example, partially overlap or completely overlap) each other or may not overlap. For example, as shown in FIG. 3a, an overlapping part between the BWP 1 and the BWP 2 is a part between a frequency f1 and a frequency f2. For another example, as shown in FIG. 3b, the BWP 1 and the BWP 2 do not overlap.

The following describes in detail the communication method in the embodiments of this application with reference to the accompanying drawings.

Figure 4:
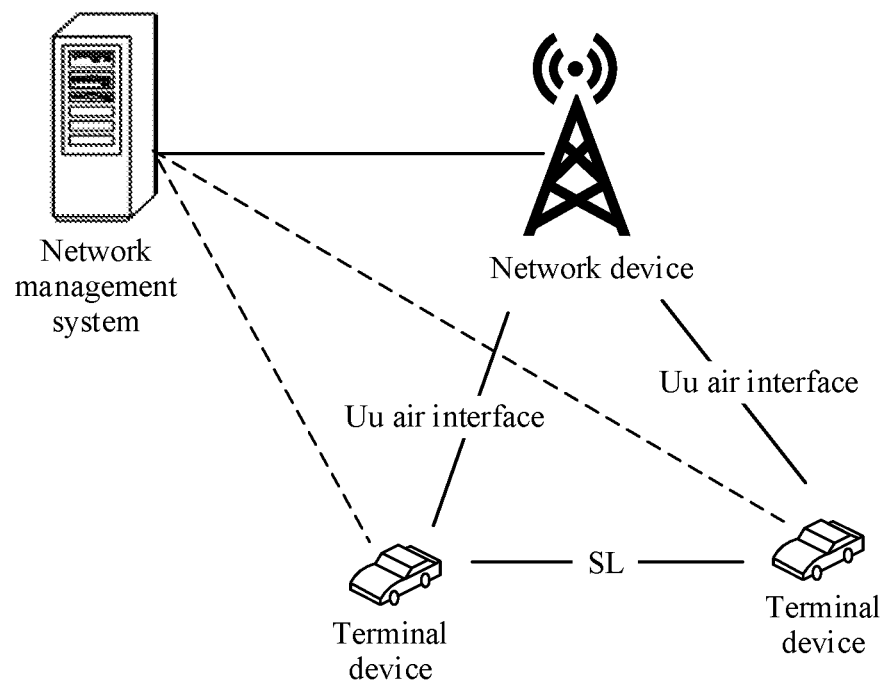
FIG. 4 is a schematic architectural diagram of a communication system according to an embodiment of this application.

The embodiments of this application may be applied to communication systems such as an LTE communication system and an NR communication system. Specifically, a network type of the communication system in the embodiments of this application may be a homogeneous network or may be a heterogeneous network. This is not limited. FIG. 4 is a schematic diagram of a network architecture of a communication system according to an embodiment of this application. The communication system includes terminal devices and a network device. Specifically, Uu air interface communication may be performed between the terminal device and the network device, and sidelink communication may be performed between the terminal devices.

In the embodiments of this application, the network device and the terminal device may be deployed on land, including indoor or outdoor, handheld, or vehicle-mounted deployment; may be deployed on the water; or may be deployed on an airplane, a balloon, and an artificial satellite in the air. Deployment scenarios of the network device and the terminal device are not limited in the embodiments of this application.

It should be understood that, in the embodiments of this application, the communication between the network device and the terminal device and the communication between the terminal devices may be performed by using a licensed spectrum (licensed spectrum), an unlicensed spectrum (unlicensed spectrum), or both a licensed spectrum and an unlicensed spectrum. This is not limited. The communication between the network device and the terminal device and the communication between the terminal devices may be performed by using a sub-6 gigahertz (gigahertz, GHz) spectrum, a spectrum above 6 GHz, or both a sub-6 GHz spectrum and a spectrum above 6 GHz. In other words, this application is applicable to both a low-frequency (for example, sub 6G) scenario and a high-frequency (above 6G) scenario. A spectrum resource used in the communication between the network device and the terminal device and a spectrum resource used in the communication between the terminal devices are not limited in the embodiments of this application.

In some other embodiments of this application, as shown in FIG. 4, the communication system further includes a network management system. The terminal device may communicate with the network management system through a wired interface or a wireless interface. In addition, in the embodiments of this application, the terminal device may communicate with the network management system through the network device or may directly communicate with the network management system. For example, the network management system may be a network management system of an operator.

The network architecture of the communication system shown in FIG. 4 is merely an example, and does not constitute a limitation on a network architecture of a communication system in the embodiments of this application. A quantity of network devices and a quantity of terminal devices in the communication system are not limited in the embodiments of this application. For example, when the communication system in the embodiments of this application includes a plurality of network devices, coordinated multipoint communication may be performed between the network devices. For example, the communication system includes a plurality of macro base stations and a plurality of micro base stations. Coordinated multipoint communication may be performed between the macro base stations, between the micro base stations, or between the macro base station and the micro base station.

It should be understood that in the embodiments of this application, the sidelink communication includes a terminal device autonomous selection mode and a network device scheduling mode. For example, in the terminal device autonomous selection mode, a terminal device may determine, from one or more resource pools configured in a BWP used for sidelink communication, one or more subchannels that are not occupied by another terminal device. Then, the terminal device may perform the sidelink communication on the determined one or more subchannels that are not occupied by the another terminal device. The BWP used for sidelink communication is preconfigured for the terminal device. It should be noted that the one or more subchannels that are determined by the terminal device and that are not occupied by the another terminal device may belong to one resource pool or may belong to a plurality of resource pools. This is not limited. For example, in the network device scheduling mode, one or more subchannels used by the terminal device to perform the sidelink communication are one or more subchannels in one or more resource pools configured in a BWP used for sidelink communication and indicated by the network device. The BWP used for sidelink communication is preconfigured for the terminal device. It should be noted that, in the embodiments of this application, for a manner in which the BWP used for sidelink communication is preconfigured for the terminal device in either the terminal device autonomous selection mode or the network device scheduling mode, refer to related descriptions in the explanations about the BWP in the foregoing terms. Details are not described herein again.

Because one or more resource pools may be preconfigured, for the terminal device, in the BWP used for sidelink communication, and each resource pool may include one or more subchannels, how to enable the network device to flexibly indicate, to the terminal device, a subchannel used for sidelink communication, to implement resource scheduling is of great significance to improve performance of the sidelink communication.

In view of this, an embodiment of this application provides a communication method, and a quantity of bits of a subchannel indication may be determined by using a reference resource pool, to implement flexible resource pool selection and flexible subchannel selection, so that a network device can flexibly schedule a resource for a terminal device from a plurality of resource pools, thereby helping improve transmission performance.

Figure 5:
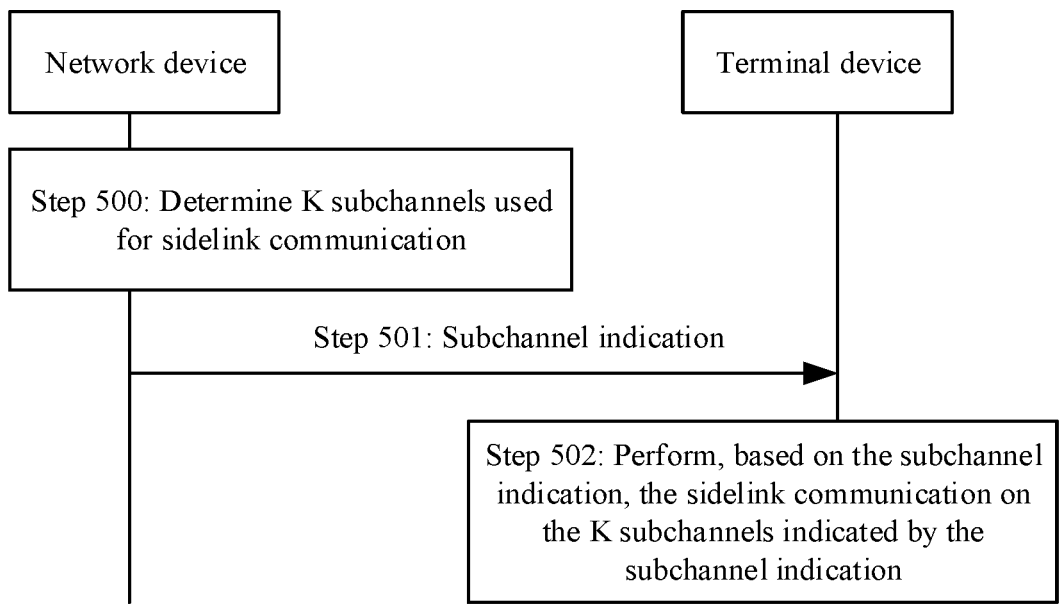
FIG. 5 is a schematic flowchart of a communication method according to an embodiment of this application.

For example, FIG. 5 is a schematic flowchart of a communication method according to an embodiment of this application. The method specifically includes the following steps.

Step 500: A network device determines K subchannels used for sidelink communication, where the K subchannels belong to M resource pools in N resource pools, and the N resource pools are resource pools corresponding to a BWP used for sidelink communication, where N is a positive integer greater than or equal to 1, $1 \leq M \leq N$, M is a positive integer, and K is a positive integer greater than or equal to 1.

For example, the network device may determine one or more subchannels from the resource pools corresponding to the BWP used for sidelink communication. Specifically, the network device may determine the K subchannels from the M resource pools in the N resource pools corresponding to the BWP used for sidelink communication.

In some embodiments, a quantity K of the subchannels determined by the network device may be determined based on an amount of data that needs to be transmitted when a terminal device performs the sidelink communication, may be determined based on current communication load, may be predefined in a protocol, or may be determined in another manner. This is not limited.

It should be noted that the BWP used for sidelink communication may be preconfigured by the network device or an operator for the terminal device, may be predefined in a protocol, and so on. The BWP used for sidelink communication may be one BWP or a plurality of BWPs. This is not limited.

The resource pools corresponding to the BWP used for sidelink communication may be some or all resource pools configured in the BWP used for sidelink communication. It should be noted that, in this embodiment of this application, the resource pools configured in the BWP used for sidelink communication may be understood as that the BWP used for sidelink communication includes a resource of the resource pools in frequency domain. For specific related descriptions, refer to related descriptions about the resource pools configured in the SL BWP in the foregoing explanations and descriptions of terms. Details are not described herein again.

In some embodiments, the N resource pools may be available resource pools configured in the BWP used for sidelink communication. The available resource pool in this embodiment of this application may be a resource pool that may be used for sidelink communication (for example, sidelink signal sending or receiving).

Figure 6:
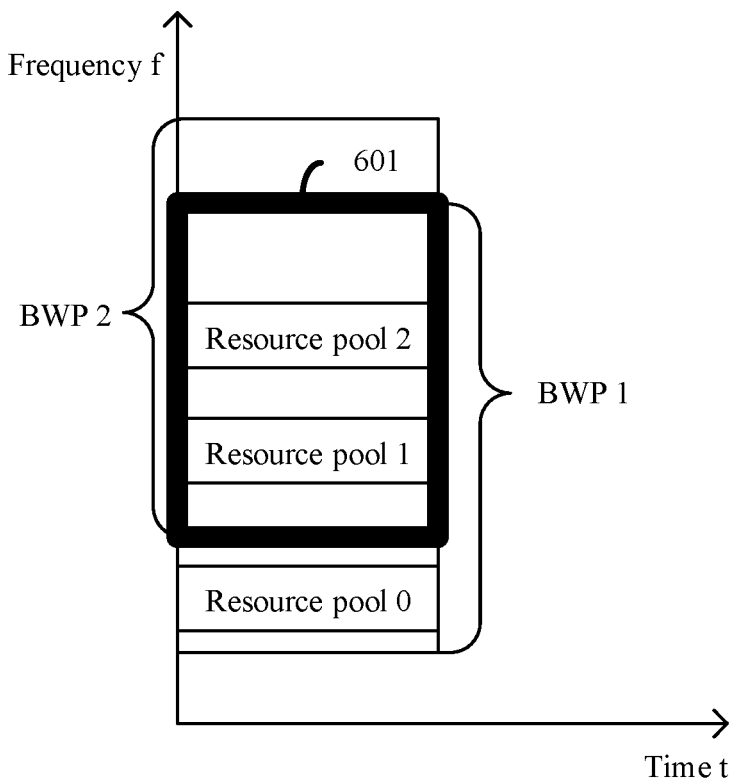
FIG. 6 is a schematic diagram of a resource pool corresponding to an overlapping resource between a BWP 1 and a BWP 2 according to an embodiment of this application.

For example, the available resource pool may be a resource pool corresponding to an overlapping resource between the BWP used for sidelink communication and a BWP used for uplink communication. For example, as shown in FIG. 6, a BWP 1 is the BWP used for sidelink communication, and a BWP 2 is the BWP used for uplink communication. An overlapping resource between the BWP 1 and the BWP 2 is a resource of a resource 601 (an area delineated by thick lines shown in FIG. 6) in frequency domain, a resource pool 0, a resource pool 1, and a resource pool 2 are configured in the BWP 1, resource pools configured in the overlapping resource between the BWP 1 and the BWP 2 are the resource pool 1 and the resource pool 2, and the resource pool corresponding to the overlapping resource between the BWP 1 and the BWP 2 may be understood as one or more of the resource pools configured in the overlapping resource between the BWP 1 and the BWP 2. Specifically, the resource pool corresponding to the overlapping resource between the BWP 1 and the BWP 2 may include the resource pool 1 and the resource pool 2, or may include only the resource pool 1 or the resource pool 2. This is not limited.

For another example, the available resource pool may alternatively be a resource pool corresponding to a resource that is in the BWP used for sidelink communication and that is used in a network device scheduling mode. For example, resource pools configured in the BWP used for sidelink communication include a resource pool 0, a resource pool 1, a resource pool 2, and a resource pool 3. The resource pool 0 and the resource pool 1 are resource pools that are used for sidelink communication and that are used in a terminal device autonomous selection mode, and resources of the resource pool 0 and the resource pool 1 in frequency domain are resources that are in the BWP used for sidelink communication and that are used in the terminal device autonomous selection mode. When the terminal device autonomous selection mode is used, the terminal device may select, from the resource pool 0 and the resource pool 1, a subchannel for sidelink communication. However, the resource pool 2 and the resource pool 3 are resource pools that are used for sidelink communication and that are used in the network device scheduling mode, and resources of the resource pool 2 and the resource pool 3 in frequency domain are resources that are in the BWP used for sidelink communication and that are used in the network device scheduling mode. It should be noted that, in this embodiment of this application, a resource pool corresponding to a resource that is in the BWP used for sidelink communication and that is used in the network device scheduling mode may be at least one of the resource pool 2 and the resource pool 3.

Figure 7:
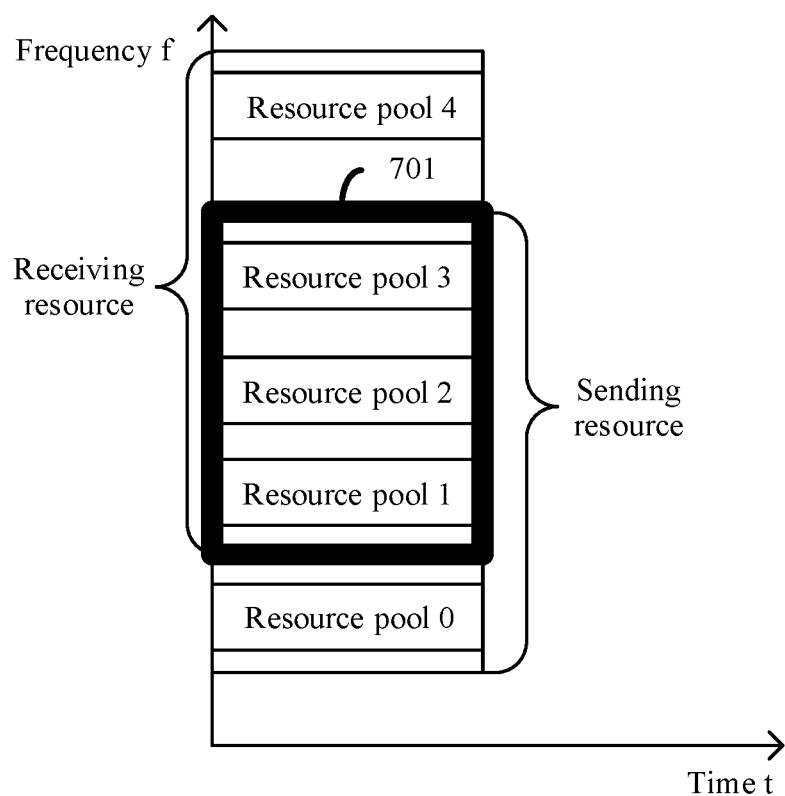
FIG. 7 is a schematic diagram of a resource pool corresponding to an overlapping resource between a receiving resource and a sending resource according to an embodiment of this application.

For another example, the available resource pool may alternatively be a resource pool corresponding to an overlapping resource between a receiving resource and a sending resource of a sidelink signal in the BWP used for sidelink communication. The receiving resource is used by a terminal device to receive the sidelink signal, and the sending resource is used by a terminal device to send the sidelink signal. Specifically, for the receiving resource and the sending resource, the terminal device that receives the sidelink signal and the terminal device that sends the sidelink signal may be a same terminal device, for example, a terminal device that receives a subchannel indication sent by the network device in step 501. It should be noted that, the terminal device that receives the subchannel indication sent by the network device in step 501 may be a transmit-side terminal device, or may be a receive-side terminal device in the sidelink communication. For example, as shown in FIG. 7, an overlapping resource between a receiving resource and a sending resource is a resource of a resource 701 (an area delineated by thick lines shown in FIG. 7) in frequency domain, and a resource pool 1, a resource pool 2, and a resource pool 3 are configured in the overlapping resource between the receiving resource and the sending resource. In this case, the resource pool corresponding to the overlapping resource between the receiving resource and the sending resource of the sidelink signal in the BWP used for sidelink communication may be at least one of the resource pool 1, the resource pool 2, and the resource pool 3. It should be noted that the receiving resource and the sending resource of the sidelink signal may belong to one BWP used for sidelink communication, or the receiving resource of the sidelink signal and the sending resource of the sidelink signal belong to different BWPs.

For another example, the available resource pool may alternatively be a resource pool corresponding to an overlapping resource between a sending resource that is of a sidelink signal in the BWP used for sidelink communication and that is of the transmit-side terminal device and a receiving resource that is of the sidelink signal in the BWP used for sidelink communication and that is of the receive-side terminal device. The transmit-side terminal device may be the terminal device that receives the subchannel indication sent by the network device in step 501, or the receive-side terminal device is the terminal device that receives the subchannel indication sent by the network device in step 501. For example, as shown in FIG. 7, the sending resource is a sending resource of the transmit-side terminal device, and the receiving resource is a receiving resource of the receive-side terminal device. A resource pool 0, a resource pool 1, a resource pool 2, and a resource pool 3 are configured in the sending resource, a resource pool 1, a resource pool 2, and a resource pool 3 are configured in the receiving resource, an overlapping resource between the receiving resource and the sending resource is a resource of the resource 701 in frequency domain, and the resource pool 1, the resource pool 2, and the resource pool 3 are configured in the overlapping resource between the receiving resource and the sending resource. In this case, the available resource pool may be at least one of the resource pool 1, the resource pool 2, and the resource pool 3. It should be noted that the sending resource that is of the sidelink signal in the BWP used for sidelink communication and that is of the transmit-side terminal device and the receiving resource that is of the sidelink signal in the BWP used for sidelink communication and that is of the receive-side terminal device may belong to one BWP used for sidelink communication, or the sending resource that is of the sidelink signal in the BWP used for sidelink communication and that is of the transmit-side terminal device and the receiving resource that is of the sidelink signal in the BWP used for sidelink communication and that is of the receive-side terminal device belong to different BWPs.

It should be noted that, in this embodiment of this application, the transmit-side terminal device may be a terminal device that sends the sidelink signal in the sidelink communication, and the receive-side terminal device may be a terminal device that receives the sidelink signal in the sidelink communication. Specifically, in the sidelink communication, the transmit-side terminal device may send the sidelink signal to the receive-side terminal device, and the receive-side terminal device may receive the sidelink signal from the transmit-side terminal device.

For another example, the available resource pool may alternatively be a resource pool corresponding to a sending resource of a sidelink signal in the BWP used for sidelink communication. The sending resource is used by the terminal device to send the sidelink signal. For example, a resource pool 0, a resource pool 1, a resource pool 2, and a resource pool 3 are configured in the sending resource of the sidelink signal in the BWP used for sidelink communication. In this case, the resource pool corresponding to the sending resource of the sidelink signal in the BWP used for sidelink communication may be at least one of the resource pool 0, the resource pool 1, the resource pool 2, and the resource pool 3.

For another example, the available resource may alternatively be a resource pool corresponding to a common resource in the BWP used for sidelink communication. It should be noted that the common resource may be preconfigured by the network device or an operator, or may be predefined in a protocol. For example, the common resource may be used for sidelink communication (for example, sidelink signal sending or receiving), or may be used for uplink communication, downlink communication, or the like. This is not limited.

In some embodiments, the N resource pools may be all resource pools configured in the BWP used for sidelink communication. For example, five resource pools are configured in the BWP used for sidelink communication, and the N resource pools corresponding to the BWP used for sidelink communication are the five resource pools configured in the BWP. It should be noted that all resource pools configured in the BWP used for sidelink communication may be understood as all sending resource pools configured in the BWP used for sidelink communication, may be understood as all receiving resource pools configured in the BWP used for sidelink communication, or may be understood as all sending resource pools and all receiving resource pools configured in the BWP used for sidelink communication. In this embodiment of this application, the sending resource pool is used to send a sidelink signal, and the receiving resource pool is used to receive the sidelink signal. It may be understood that the sending resource pool and the receiving resource pool in this embodiment of this application may partially or completely overlap. In addition, all the resource pools configured in the BWP used for sidelink communication may be all resource pools configured, for all terminal devices in one or more cells, in the BWP used for sidelink communication, or may be all resource pools configured, for one terminal device, in the BWP used for sidelink communication. This is not limited.

It should be noted that the foregoing description is merely an example of the N resource pools, and does not constitute a limitation on the N resource pools.

Step 501: The network device sends a subchannel indication to a terminal device. The subchannel indication is used to indicate the K subchannels used for sidelink communication.

A quantity of bits of the subchannel indication is determined based on a quantity of subchannels included in a reference resource pool. For example, the reference resource pool may be a resource pool in the N resource pools.

Step 502: The terminal device receives the subchannel indication sent by the network device, and performs, based on the subchannel indication, the sidelink communication on the K subchannels indicated by the subchannel indication.

For example, the subchannel indication is used to indicate a resource for sidelink communication.

For example, the subchannel indication may be sent by the network device by using higher layer signaling, may be sent by using physical layer signaling (for example, downlink control information (downlink control information, DCI)), or may be sent by using other information or signaling. This is not limited. For example, the higher layer signaling may be RRC signaling, system information (for example, a SIB), broadcast information, or the like.

It should be noted that, in some embodiments, when a sidelink signal does not need to be transmitted, the network device may also send the subchannel indication to the terminal device, where the subchannel indication is used to indicate the K subchannels used for sidelink communication, and the K subchannels belong to the M resource pools. A value of K may be 0, and/or a value of M may be 0. In this way, before performing sidelink communication and when receiving the subchannel indication that indicates 0 subchannels, the terminal device prepares, in advance, based on the BWP that is indicated by the network device and that is used for sidelink communication, a resource pool corresponding to the BWP used for sidelink communication, to improve sidelink communication efficiency. In some other embodiments, in some cases in which a sidelink signal does not need to be transmitted, the network device may not send the subchannel indication to the terminal device, thereby helping reduce signaling overheads.

In this embodiment of this application, the quantity of bits of the subchannel indication may be determined based on the quantity of subchannels included in the reference resource pool. Therefore, when the subchannel indication indicates subchannels of a plurality of resource pools, understanding of the subchannel indication by the network device and the terminal device can be unified, to help implement flexible scheduling of subchannels in the sidelink communication, and improve transmission performance.

The following describes in detail a specific implementation of the reference resource pool in this embodiment of this application.

In some embodiments, the reference resource pool may be a resource pool with a largest quantity of subchannels in resource pools configured in the BWP used for sidelink communication. For example, the reference resource pool is a resource pool that includes a largest quantity of subchannels in the N resource pools corresponding to the BWP used for sidelink communication. For example, the N resource pools may be available resource pools. In this case, the reference resource pool is a resource pool with a largest quantity of subchannels in the available resource pools. FIG. 2 is used as an example. The resource pool 0 and the resource pool 1 are available resource pools, the resource pool 0 includes three subchannels, and the resource pool 1 includes four subchannels. In this case, the reference resource pool is the resource pool 1. When the N resource pools may be all resource pools configured in the BWP used for sidelink communication, the reference resource pool is a resource pool with a largest quantity of subchannels in all the resource pools configured in the BWP used for sidelink communication. It should be noted that, when the N resource pools corresponding to the BWP used for sidelink communication include a plurality of resource pools with a largest quantity of subchannels, the reference resource pool may be any one of the resource pools with the largest quantity of subchannels.

In some other embodiments, the reference resource pool is a resource pool indicated by the network device to the terminal device. For example, the network device may indicate the resource pool to the terminal device by using RRC signaling or other information. For example, that the reference resource pool is a resource pool indicated by the network device to the terminal device may alternatively be described as follows: The network device may indicate, to the terminal device, a resource pool corresponding to the reference resource pool in the N resource pools corresponding to the BWP used for sidelink communication, or the network device may indicate, to the terminal device, a resource pool that is used as the reference resource pool and that is in the N resource pools corresponding to the BWP used for sidelink communication. For example, the reference resource pool is a resource pool used for sidelink signal receiving and/or a resource pool used for sidelink signal sending in the N resource pools corresponding to the BWP used for sidelink communication and is indicated by the network device to the terminal device. For another example, the N resource pools corresponding to the BWP used for sidelink communication are a resource pool 0, a resource pool 1, a resource pool 2, . . . , and a resource pool N−1. In this case, when the reference resource pool is a resource pool n, the network device may indicate, to the terminal device, that a resource pool that corresponds to the reference resource pool and that is in the N resource pools corresponding to the BWP used for sidelink communication is the resource pool n, or the network device may indicate, to the terminal device, that a resource pool that is used as the reference resource pool and that is in the N resource pools corresponding to the BWP used for sidelink communication is a resource pool n.

In some other embodiments, the reference resource pool is determined based on a resource pool identifier. For example, the reference resource pool is determined based on identifiers of the N resource pools corresponding to the BWP used for sidelink communication. For example, the reference resource pool may be a resource pool with a smallest identifier in the identifiers of the N resource pools, a resource pool with a largest identifier in the N resource pools, or a resource pool corresponding to an identifier that meets another preset rule or algorithm and that is in the identifiers of the N resource pools. The preset rule or algorithm may be correspondingly set according to an actual requirement. This is not limited herein. For another example, the reference resource pool may alternatively be determined based on identifiers of all resource pools configured in the BWP used for sidelink communication.

In some other embodiments, for the network device, the reference resource pool may be a resource pool to which a subchannel indicated by a previous subchannel indication belongs. For the network device, the previous subchannel indication is a subchannel indication last sent before the network device sends the subchannel indication when performing step 501. For the terminal device, the previous subchannel indication is a subchannel indication last received before the terminal device receives the subchannel indication sent when the network device performs step 501. It may be understood as that the reference resource pool is determined based on a last or previously scheduled resource pool. For example, an example in which the network device sends the subchannel indication to the terminal device by using DCI is used. The reference resource pool is a resource pool to which a subchannel last scheduled by using the DCI belongs. For example, when there are a plurality of resource pools to which a subchannel last scheduled by the network device for the terminal device belongs, the reference resource pool may be a resource pool with a largest quantity of subchannels in the resource pools to which the subchannel last scheduled by the network device for the terminal device belongs, or may be another resource pool. For example, the reference resource pool is determined based on identifiers of the resource pools to which the subchannel last scheduled by the network device for the terminal device belongs, or the reference resource pool is a resource pool in the resource pools to which the subchannel last scheduled by the network device for the terminal device belongs, and so on. For example, a current moment is T1, the network device sends a subchannel indication to the terminal device at the moment T1, and a resource pool to which a subchannel indicated by a subchannel indication last sent by the network device to the terminal device before the moment T1 belongs is a resource pool 0. In this case, the reference resource pool is resource pool 0. For another example, a current moment is T1, the network device sends a subchannel indication to the terminal device at the moment T1, and resource pools to which a subchannel indicated by a subchannel indication last sent by the network device to the terminal device before the moment T1 belongs are a resource pool 0 and a resource pool 1. In this case, the reference resource pool is at least one of the resource pool 0 and the resource pool 1. For example, the reference resource pool may be the resource pool 0, may be the resource pool 1, or may be the resource pool 0 and the resource pool 1. A specific reference resource pool or specific reference resource pools in the resource pool 0 and the resource pool 1 may be determined according to a preset algorithm or rule.

It should be noted that, in this embodiment of this application, the network device schedules the subchannel from one or more resource pools configured for the terminal device, and the one or more resource pools configured for the terminal device are resource pools configured in the BWP used for sidelink communication and configured for the terminal device.

In some other embodiments, the reference resource pool may alternatively be a default resource pool, may be a resource pool predefined in a protocol, or may be determined by using a preset algorithm or rule.

In some other embodiments, the reference resource pool may alternatively be the N resource pools corresponding to the BWP used for sidelink communication. For related descriptions of the N resource pools, refer to related descriptions of the N resource pools in step 500. Details are not described herein again. For example, in this case, "determining, based on a quantity of subchannels included in the reference resource pool" in this embodiment of this application may also be described as determining, based on a quantity of subchannels included in the N resource pools corresponding to the BWP used for sidelink communication, or may be simply referred to as determining, based on a quantity of subchannels included in the BWP used for sidelink communication.

The foregoing description is merely an example description of specific implementations of the reference resource pool, and does not constitute a limitation on this embodiment of this application. In this embodiment of this application, the reference resource pool may alternatively be determined in another manner.

An example in which the subchannel indication is used to indicate the K subchannels, and the K subchannels belong to the M resource pools is used below to describe in detail a specific implementation of a quantity, of bits of the subchannel indication, determined based on a quantity of subchannels included in the reference resource pool. It should be noted that, in this embodiment of this application, the subchannels included in the resource pool may be understood as subchannels included in the resource pool.

In some embodiments, quantities of bits of subchannel subindications respectively corresponding to the M resource pools are determined based on the quantity of subchannels included in the reference resource pool, and the quantity of bits of the subchannel indication is determined based on a sum of the quantities of bits of the subchannel subindications corresponding to the M resource pools. A resource pool i in the M resource pools is used as an example, where $1 \leq i \leq M$, and i is a positive integer. A quantity of bits of a subchannel subindication corresponding to the resource pool i is determined based on the quantity of subchannels included in the reference resource pool.

Specifically, the quantity of bits of the subchannel subindication corresponding to the resource pool i is Ri, and the quantity of bits of the subchannel indication is R, where $$R = \sum_{i=0}^{M} Ri,$$

M is a quantity of resource pools to which the K subchannels indicated by the subchannel indication belong, and R and Ri are positive integers greater than or equal to 1.

An example in which the quantity of bits determined based on the quantity of subchannels included in the reference resource pool is V is used, where $$R = \sum_{i=0}^{M} Ri = V \text{ or } R = \sum_{i=0}^{M} Ri = M \times V.$$

When $$R = \sum_{i=0}^{M} Ri = M \times V,$$

in an example, the quantity of bits of the subchannel indication corresponding to the resource pool i is Ri equal to V, which helps simplify implementation.

When $$R = \sum_{i=0}^{M} Ri = V,$$

in an example, that the quantity of bits of the subchannel indication corresponding to the resource pool i is Ri may be determined based on the quantity of subchannels included in the reference resource pool and the quantity M of resource pools to which the K subchannels belong. For example, the quantity of bits of the subchannel indication corresponding to the resource pool i may be determined based on the quantity of bits of the subchannel indication and the quantity M of resource pools to which the K subchannels belong. For example, the quantity of bits determined based on the quantity of subchannels included in the reference resource pool is allocated, by using an equal division method, to the subchannel subindications corresponding to the M resource pools. The quantity Ri of bits of the subchannel subindication corresponding to the resource pool i is used as an example. The quantity Ri of bits of the subchannel subindication corresponding to the resource pool i is equal to R/M, where R is the quantity of bits of the subchannel indication, and M is the quantity of resource pools to which the K subchannels indicated by the subchannel indication belong. Further, the quantity Ri of bits of the subchannel subindication corresponding to the resource pool i is R/M rounded up or rounded down. For another example, the quantity of bits determined based on the quantity of subchannels included in the reference resource pool is allocated, by using an equal proportion method, to the subchannel subindications corresponding to the M resource pools. The quantity Ri of bits of the subchannel subindication corresponding to the resource pool i is used as an example. A quantity of subchannels included in the resource pool i is S_sub_channeli, and a sum of quantities of subchannels included in each of the M resource pools is S_total. In this case, the quantity Ri of bits of the subchannel subindication corresponding to the resource pool i is equal to R×(S_sub_channeli/S_total). R is the quantity of bits of the subchannel indication. Further, the quantity Ri of bits of the subchannel subindication corresponding to the resource pool i is R×(S_sub_channeli/S_total) rounded up or rounded down. This helps reduce overheads of the subchannel indication, improve resource utilization, and improve performance of sidelink communication.

In addition, when $$R = \sum_{i=0}^{M} Ri = V,$$

that the quantity of bits of the subchannel indication corresponding to the resource pool i is Ri may alternatively be determined based on the quantity of subchannels included in the reference resource pool and the quantity M of resource pools to which the K subchannels belong in another manner. This is not limited.

The following describes the subchannel subindication corresponding to the resource pool i in detail by using an example in which a quantity of bits required to indicate a subchannel in the resource pool i is W and the quantity of bits of the subchannel subindication corresponding to the resource pool i is Ri.

For example, when W is less than Ri, for the resource pool i, the network device may pad the W bits required to indicate the subchannel in the resource pool i with (Ri−W) 0s, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may determine, based on the W bits in the subchannel subindication corresponding to the resource pool i, the subchannel indicated by the subchannel subindication corresponding to the resource pool i. Specifically, when W is less than Ri, for the resource pool i, the network device may perform zero-padding (zero-padding) on the W bits required to indicate the subchannel in the resource pool i, so that the quantity of bits indicating the subchannel in the resource pool i reaches the quantity Ri of bits of the subchannel subindication corresponding to the resource pool i, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may perform interception from a corresponding bit of the subchannel subindication corresponding to the resource pool i until the W bits are intercepted, and then determine, based on the intercepted W bits, the subchannel indicated by the subchannel subindication corresponding to the resource pool i.

In some embodiments, when the quantity of subchannels included in the reference resource pool is greater than a quantity of subchannels included in the resource pool i, the quantity W of bits required to indicate the subchannel in the resource pool i may be less than the quantity Ri of bits determined based on the quantity of subchannels included in the reference resource pool.

For example, when W is less than Ri, for the resource pool i, the network device may pad the W bits required to indicate the subchannel in the resource pool i with (Ri−W) 0s before a most significant bit, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may determine, based on W least significant bits in the subchannel subindication corresponding to the resource pool i, the subchannel indicated by the subchannel subindication corresponding to the resource pool i. Specifically, for the resource pool i, the network device pads, in ascending order of bits, starting from a most significant bit, the W bits required to indicate the subchannel in the resource pool i with 0s until the quantity of bits indicating the subchannel in the resource pool i reaches Ri, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may perform interception, in ascending order of bits, starting from a least significant bit, on the subchannel subindication corresponding to the resource pool i until the W bits are intercepted, and then determine, based on the W bits, the subchannel indicated by the subchannel subindication corresponding to the resource pool i. An example in which the quantity of bits of the subchannel subindication corresponding to the resource pool i is 6, and the quantity of bits required to indicate the subchannel in the resource pool i is 4 is used. If a bit value of the four bits indicating the subchannel in the resource pool i is 1101, the subchannel subindication corresponding to the resource pool i is 001101, and two most significant bits of the subchannel subindication corresponding to the resource pool i are padding 0s.

For another example, when W is less than Ri, for the resource pool i, the network device may pad the W bits required to indicate the subchannel in the resource pool i with (Ri−W) 0s after a least significant bit, to obtain the subchannel subindication corresponding to the resource pool i. The network device may send the subchannel subindication corresponding to the resource pool i. The terminal device may determine, based on W most significant bits in the received subchannel subindication corresponding to the resource pool i, the subchannel indicated by the subchannel subindication corresponding to the resource pool i. Specifically, for the resource pool i, the network device pads, in descending order of bits, starting from a least significant bit, the W bits required to indicate the subchannel in the resource pool i with 0s until the quantity of bits indicating the subchannel in the resource pool i reaches Ri, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may perform interception, in descending order of bits, starting from a most significant bit, on the subchannel subindication corresponding to the resource pool i until the W bits are intercepted, and then determine, based on the W bits, the subchannel indicated by the subchannel subindication corresponding to the resource pool i. An example in which the quantity of bits of the subchannel subindication corresponding to the resource pool i is 6, and the quantity of bits required to indicate the subchannel in the resource pool i is 4 is used. If a bit value of the four bits indicating the subchannel in the resource pool i is 1101, the subchannel subindication corresponding to the resource pool i is 110100, and two least significant bits of the subchannel subindication corresponding to the resource pool i are padding 0s.

It should be understood that the foregoing embodiment is merely an example. When W is less than Ri, the terminal device may perform interception starting from a least significant bit of the subchannel subindication corresponding to the resource pool i, may perform interception starting from a most significant bit of the subchannel subindication corresponding to the resource pool i, or may perform interception starting from another bit of the subchannel subindication corresponding to the resource pool i. This is not limited. A specific manner in which the terminal device intercepts, from the subchannel subindication corresponding to the resource pool i, bits that are actually used to indicate the subchannel in the resource pool i is related to a manner in which the network device performs zero-padding. It should be noted that the manner in which the bits actually used to indicate the subchannel in the resource pool i are intercepted from the subchannel subindication corresponding to the resource pool i may be notified to the terminal device by the network device or an operator, or may be predefined in a protocol, and so on. This is not limited.

It should be further noted that, in this embodiment of this application, for the network device, when W is less than Ri, for the resource pool i, the network device may pad the W bits required to indicate the subchannel in the resource pool i with the (Ri–W) 0s, or may pad the W bits required to indicate the subchannel in the resource pool i with (Ri–W) 1s or other information. This is not limited. Specific information with which the W bits required to indicate the subchannel in the resource pool i are padded is predefined in a protocol, or may be indicated by the network device or the operator to the terminal device, and so on.

For another example, when W is greater than Ri, for the resource pool i, the network device may intercept Ri bits from the W bits required to indicate the subchannel in the resource pool i, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may pad the subchannel subindication corresponding to the resource pool i with (W–Ri) 0s (zero-padding), and then determine, based on the subchannel indication that corresponds to the resource pool i and that is padded with the (W–Ri) 0s, the subchannel indicated by the subchannel subindication corresponding to the resource pool i. Specifically, for the resource pool i, the network device may perform interception, starting from a corresponding bit of bits corresponding to a quantity of bits required to indicate the subchannel in the resource pool i, until the Ri bits are intercepted, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may perform zero-padding (zero-padding) on the subchannel subindication corresponding to the resource pool i, until a quantity of bits of the subchannel subindication corresponding to the resource pool i is increased to the quantity W of bits required to indicate the subchannel in the resource pool i, and then determine, based on the W bits obtained after the zero-padding, the subchannel indicated by the subchannel subindication corresponding to the resource pool i.

In some embodiments, when the quantity of subchannels included in the reference resource pool is less than a quantity of subchannels included in the resource pool i, the quantity W of bits required to indicate the subchannel in the resource pool i is greater than the quantity Ri of bits determined based on the quantity of subchannels included in the reference resource pool. It should be noted that, in this case, when the network device indicates the subchannel in the resource pool i to the terminal device, a quantity of subchannels in the resource pool i that are indicated by the network device to the terminal device does not exceed the quantity of subchannels included in the reference resource pool, thereby helping avoid information loss and improve a probability of correct decoding by the terminal device. In addition, the foregoing manner further helps implement flexible scheduling of subchannels in the resource pool i.

For example, when W is greater than Ri, for the resource pool i, the network device may intercept Ri least significant bits from the W bits required to indicate the subchannel in the resource pool i, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may pad the subchannel subindication corresponding to the resource pool i with (W–Ri) 0s before a most significant bit, and then determine, based on the subchannel indication that corresponds to the resource pool i and that is padded with the (W–Ri) 0s, the subchannel indicated by the subchannel subindication corresponding to the resource pool i. Specifically, for the resource pool i, the network device may perform interception, in ascending order of bits, starting from a least significant bit, on the W bits required to indicate the subchannel in the resource pool i, until a quantity of intercepted bits reaches Ri, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may pad, starting from a most significant bit, the subchannel subindication corresponding to the resource pool i with 0s, until the quantity Ri of bits of the subchannel subindication corresponding to the resource pool i is increased to the quantity W of bits required to indicate the subchannel in the resource pool i, and then determine, based on the W bits that are obtained after the zero-padding and that indicate the subchannel in the resource pool i, the subchannel indicated by the subchannel subindication corresponding to the resource pool i. The quantity of bits of the subchannel subindication corresponding to the resource pool i is 4, and the quantity of bits required to indicate the subchannel in the resource pool i is 6. If a bit value of the six bits indicating the subchannel in the resource pool i is 001101, the subchannel subindication corresponding to the resource pool i is 1101, and a bit value of four least significant bits of the bits required to indicate the subchannel in the resource pool i is the subchannel subindication corresponding to the resource pool i.

For another example, when W is greater than Ri, for the resource pool i, the network device may intercept Ri most significant bits from the W bits required to indicate the subchannel in the resource pool i, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may pad the subchannel subindication corresponding to the resource pool i with (W–Ri) 0s after a least significant bit, and then determine, based on the subchannel indication that corresponds to the resource pool i and that is padded with the (W–Ri) 0s, the subchannel indicated by the subchannel subindication corresponding to the resource pool i. Specifically, for the resource pool i, the network device may perform interception, in descending order of bits, starting from a most significant bit, on the W bits required to indicate the subchannel in the resource pool i, until a quantity of intercepted bits reaches Ri, to obtain the subchannel subindication corresponding to the resource pool i. The network device may send the subchannel subindication corresponding to the resource pool i. The terminal device may receive the subchannel subindication corresponding to the resource pool i sent by the network device. The terminal device may pad, starting from a least significant bit, the subchannel subindication corresponding to the resource pool i with 0s, until the quantity Ri of bits of the subchannel subindication corresponding to the resource pool i is increased to the quantity W of bits required to indicate the subchannel in the resource pool i, and then determine, based on the W bits that are obtained after the zero-padding and that indicate the subchannel in the resource pool i, the subchannel indicated by the subchannel subindication corresponding to the resource pool i. The quantity of bits of the subchannel subindication corresponding to the resource pool i is 4, and the quantity of bits required to indicate the subchannel in the resource pool i is 6. If a bit value of the six bits indicating the subchannel in the resource pool i is 110100, the subchannel subindication corresponding to the resource pool i is 1101, and a bit value of four most significant bits of the six bits required to indicate the subchannel in the resource pool i is the subchannel subindication corresponding to the resource pool i.

It should be understood that the foregoing embodiment is merely an example. When W is greater than Ri, the terminal device may pad, starting from a least significant bit, the subchannel subindication corresponding to the resource pool i with 0s, may pad, starting from a most significant bit, the subchannel subindication corresponding to the resource pool i with 0s, or may pad, starting from another bit, the subchannel subindication corresponding to the resource pool i with 0s. This is not limited. A specific manner in which the terminal device pads the subchannel subindication corresponding to the resource pool i with 0s to obtain a quantity of bits actually required to indicate the subchannel in the resource pool i is related to a manner in which the network device intercepts the subchannel subindication corresponding to the resource pool i from the W bits required to indicate the subchannel in the resource pool i. It should be noted that, the manner of padding the subchannel subindication corresponding to the resource pool i with 0s to obtain the quantity of bits actually required to indicate the subchannel in the resource pool i may be notified to the terminal device by the network device or an operator, or may be predefined in a protocol, and so on. This is not limited.

It should be further noted that, in this embodiment of this application, for the terminal device, when W is greater than Ri, for the resource pool i, the terminal device may pad the subchannel subindication corresponding to the resource pool i with (W−Ri) 0s, or may pad the subchannel subindication corresponding to the resource pool i with (W−Ri) 1s or other information. This is not limited. Specific information with which the subchannel subindication corresponding to the resource pool i is padded is predefined in a protocol, or may be indicated by the network device or the operator to the terminal device, and so on.

The foregoing description is provided only by using the subchannel subindication that corresponds to the resource pool i and that is in the subchannel indication as an example. For a subchannel subindication corresponding to another resource pool, refer to the implementation of the subchannel indication corresponding to the resource pool i. Details are not described herein again.

It should be noted that, when the subchannel indication includes the M subchannel subindications, in an example, the subchannel subindications in the subchannel indication may be arranged in descending order of resource pool identifiers, may be arranged in ascending order of resource pool identifiers, may be arranged based on a resource pool sequence indicated by the network device, or may be arranged according to another rule, to help improve reliability and accuracy of decoding the subchannel indication by the terminal device. An arrangement rule of the subchannel subindications in the subchannel indication may be indicated by the network device or the operator to the terminal device, may be indicated by a network management system to the terminal device, or may be predefined in a protocol. This is not limited.

For example, the subchannel indication includes a subchannel subindication 0 and a subchannel subindication 1, where the subchannel subindication 0 is a subchannel subindication corresponding to a resource pool 0, and the subchannel subindication 1 is a subchannel subindication corresponding to a resource pool 1. If an identifier of the resource pool 0 is 0, an identifier of the resource pool 1 is 1, the subchannel subindication 0 is 0010, and the subchannel subindication 1 is 0111, when the subchannel subindications in the subchannel indication are arranged in ascending order of resource pool identifiers, the subchannel indication is 00100111.

The foregoing description is merely an example of the subchannel subindication corresponding to the resource pool i, and does not constitute a limitation on this embodiment of this application.

In addition, in this embodiment of this application, for the subchannel subindication corresponding to the resource pool i, a resource indication value (resource indication value, RIV) or a bitmap manner may be used to indicate the subchannel in the resource pool i, or another manner may be used to indicate the subchannel in the resource pool i. This is not limited.

For example, when the RIV is used, for the subchannel subindication corresponding to the resource pool i, to indicate the subchannel in the resource pool i, the subchannel subindication may include subchannel start identifier information and subchannel quantity information. The subchannel start identifier information may also be referred to as start subchannel information, a start subchannel identifier, subchannel start information, or the like for short, and the subchannel quantity information may also be referred to as subchannel length information, a subchannel length, or the like.

For example, when the RIV is used, for the subchannel subindication corresponding to the resource pool i, to indicate the subchannel in the resource pool i, the subchannel start identifier information and the subchannel quantity information are indicated by using the RIV for the subchannel subindication, to indicate the subchannel in the resource pool i. For example, the resource pool i includes a subchannel 0, a subchannel 1, a subchannel 2, and a subchannel 3. If the subchannel subindication indicates the subchannel 0 and the subchannel 1 in the resource pool i, when the RIV is used, for the subchannel subindication corresponding to the resource pool i, to indicate the subchannel in the resource pool i, the subchannel subindication corresponding to the resource pool i includes start identifier information of the subchannel 0 and subchannel quantity information, and the subchannel quantity information is used to indicate that a quantity of subchannels is 2. For example, in this case, the quantity of bits required to indicate the subchannel in the resource pool i is $\log_2(R\times(R+1)/2)$, where R is the quantity of subchannels included in the resource pool i; and the quantity of bits of the subchannel subindication corresponding to the resource pool i is $\log_2(S\times(S+1)/2)$, where S is the quantity of subchannels included in the resource pool i.

It should be noted that, using an example in which the RIV is used, for the subchannel subindication corresponding to the resource pool i, to indicate the subchannel in the resource pool i, for the resource pool i, a correspondence between the RIV (resource indication value), a subchannel set start identifier of the resource pool i, and a subchannel length (that is, a quantity of subchannels) is preset. An example in which a subchannel start identifier that is of the resource pool i and that corresponds to the RIV is $n_{subCH}^{start}$, and a subchannel length is $L_{subCH}$ is used. $L_{subCH} \geq 1$. When the subchannel indication corresponding to the resource pool i indicates the start start L identifier $n_{subCH}^{start}$ of the subchannel and the subchannel length $L_{subCH}$ by using the RIV, the RIV satisfies the following expression:

$$RIV = \begin{cases} N_{subCH}(L_{subCH} - 1) + n_{subCH}^{start}, & (L_{subCH} - 1) \leq \lfloor N_{subCH}/2 \rfloor \\ N_{subCH}(N_{subCH} - L_{subCH} + 1) + (N_{subCH} - 1 - n_{subCH}^{start}), & (L_{subCH} - 1) > \lfloor N_{subCH}/2 \rfloor \end{cases}$$

$N_{subCH}$ is a total quantity (or a total length) of subchannels in the resource pool i or the reference resource pool.

For example, when a bitmap is used, for the subchannel subindication corresponding to the resource pool i, to indicate the subchannel in the resource pool i, the resource pool i is used as an example, the resource pool i includes three subchannels, for example, a subchannel 0, a subchannel 1, and a subchannel 2, and a quantity of bits required to indicate the subchannel in the resource pool i is 3. For example, 001 is used to indicate the subchannel 0 in the resource pool i, 010 is used to indicate the subchannel 1 in the resource pool i, 100 is used to indicate the subchannel 2 in the resource pool i, 011 is used to indicate the subchannel 0 and the subchannel 1 in the resource pool i, 101 is used to indicate the subchannel 2 and the subchannel 0 in the resource pool i, 110 is used to indicate the subchannel 2 and the subchannel 1 in the resource pool i, and 111 is used to indicate the subchannel 0, the subchannel 1, and the subchannel 2 in the resource pool i. If the quantity of bits of the subchannel subindication corresponding to the resource pool i is 4, if the subchannel subindication corresponding to the resource pool i indicates the subchannel 1 and the subchannel 0, the subchannel indication corresponding to the resource pool i may be 0101, or may be 1010 or the like, where actually valid information in the subchannel indication 0101 corresponding to the resource pool i is 101. If the subchannel indication corresponding to the resource pool i may be 0101, the most significant bit 0 is a padding 0. If the subchannel indication corresponding to the resource pool i may be 1010, the least significant bit 0 is a padding 0.

In addition, it should be noted that, in this embodiment of this application, for the resource pool i, one or more subchannels in the resource pool i may be alternatively indicated by compressing the subchannels. For example, the resource pool i includes P subchannels. The P subchannels are compressed into Q subchannel sets, and each subchannel set includes one or more subchannels in the P subchannels. P is greater than Q, and both P and Q are positive integers. It should be noted that quantities of subchannels included in different subchannel sets may be the same or different. In addition, a same subchannel may be divided into different subchannel sets, or may be divided into only one subchannel set. This is not limited either. In this embodiment of this application, a manner of dividing the subchannels included in the resource pool i into the subchannel sets may be predefined in a protocol, or may be indicated to the terminal device by the network device, the operator, or the like. This is not limited. For example, the resource pool i includes a subchannel 0, a subchannel 1, a subchannel 2, and a subchannel 3. In this embodiment of this application, the subchannel 0 and the subchannel 1 may be compressed into a subchannel set 0, and the subchannel 3 and the subchannel 4 are compressed into a subchannel set 1. For the resource pool i, the one or more subchannels in the resource pool i may be alternatively indicated by indicating the subchannel set 0 and the subchannel set 1, thereby helping to reduce signaling overheads.

For example, when the RIV is used, for the subchannel subindication corresponding to the resource pool i, to indicate the subchannel set in the resource pool i, subchannel set start identifier information and subchannel set quantity information may be indicated by using the RIV for the subchannel subindication, to indicate the subchannel in the resource pool i. It should be noted that a subchannel set start identifier is a subchannel start identifier of at least one subchannel included in the subchannel set. For example, the subchannel set start identifier may be a minimum value of identifiers of subchannels in the subchannel set.

Using an example in which the RIV is used, for the subchannel subindication corresponding to the resource pool i, to indicate the subchannel in the resource pool i, for the resource pool i, a correspondence between the RIV (resource indication value), a subchannel set start identifier of the resource pool i, and a subchannel set length (that is, a quantity of subchannel sets) is preset. An example in which a subchannel set start identifier that is of the resource pool i and that corresponds to the RIV is $n'^{start}_{subCH}$, and a subchannel set length is $L'_{subCH}$ is used, and the RIV may satisfy the following expression:

$$RIV = \begin{cases} N_{subCH}(L'_{subCH} - 1) + n'^{start}_{subCH}, & (L'_{subCH} - 1) \leq \lfloor N_{subCH}/2 \rfloor \\ N_{subCH}(N_{subCH} - L'_{subCH} + 1) + (N_{subCH} - 1 - n'^{start}_{subCH}), & (L'_{subCH} - 1) > \lfloor N_{subCH}/2 \rfloor \end{cases}$$

$N_{subCH}$ is a total quantity of subchannels in the resource pool i or the reference resource pool.

For example, when the subchannels included in the resource pool i are a plurality of compressed subchannel sets, where each subchannel set may include H consecutive subchannels, or a quantity of subchannels included in the first subchannel set and/or the last subchannel set may be less than H, and different subchannel sets include different subchannels, $L'_{subCH}=L_{subCH}/H$ and $n'^{start}_{subCH}=n^{start}_{subCH}/H$.

In some embodiments, H may be determined based on the quantity of subchannels included in the reference resource pool and the quantity of subchannels included in the resource pool i. For example, the quantity of subchannels included in the reference resource pool is N1, and the quantity of subchannels included in the resource pool i is N2, where H is less than or equal to a value obtained by rounding down N2/N1, and H is a positive integer, or H is less than or equal to a value obtained by rounding up N2/N1, and H is a positive integer. For example, H may be one of 1, 2, 4, 8, or the like. In some other embodiments, a value of H may be predefined in a protocol, or a value based on a preset rule or algorithm may be preconfigured by the network device or the operator, and so on. A manner of setting the value of H is not limited in this embodiment of this application.

For example, when the subchannel set includes H subchannels, the subchannel start identifier information $n_{subCH}^{start}$ indicated by using the RIV used for the subchannel subindication corresponding to the resource pool i may be 0, H, 2×H, . . . , and (N1−1)×H, and the subchannel quantity information is $L_{subCH}$=H, 2×H, . . . , and N1*H. N1 is a quantity of subchannels included in the reference resource pool.

For example, the resource pool i includes a subchannel 0, a subchannel 1, a subchannel 2, and a subchannel 3. The subchannel 0, the subchannel 1, the subchannel 2, and the subchannel 3 that are included in the resource pool i are compressed into a subchannel set 0 and a subchannel set 1. The subchannel set 0 includes the subchannel 0 and the subchannel 1, and the subchannel set 1 includes the subchannel set 2 and the subchannel set 3. An example in which the subchannel subindication corresponding to the resource pool i is used to indicate the subchannel 0 and the subchannel 1. If the RIV is used for indication for the subchannel subindication corresponding to the resource pool i, the subchannel indication corresponding to the resource pool i is an RIV corresponding to a start identifier of the subchannel set 0 and a subchannel length 1. An example in which the subchannel subindication corresponding to the resource pool i is used to indicate the subchannel 2 and the subchannel 3. If an RIV is used for indication for the subchannel subindication corresponding to the resource pool i, the subchannel indication corresponding to the resource pool i is an RIV corresponding to a start identifier of the subchannel set 1 and a subchannel length 1. An example in which the subchannel subindication corresponding to the resource pool i is used to indicate the subchannel 0, the subchannel 1, the subchannel 2, and the subchannel 3. If an RIV is used for indication for the subchannel subindication corresponding to the resource pool i, the subchannel indication corresponding to the resource pool i is an RIV corresponding to a start identifier of the subchannel set 0 and a subchannel length 2. It should be noted that a subchannel set start identifier may be a start identifier of at least one subchannel included in the subchannel set. For example, the subchannel set 0 includes the subchannel 0 and the subchannel 1, and a start identifier of the subchannel set 0 is a ratio of an identifier of the subchannel 0 to a quantity of subchannels included in the subchannel set 0. For another example, the subchannel set 1 includes the subchannel 2 and the subchannel 3, and a start identifier of the subchannel set 1 is a ratio of an identifier of the subchannel 2 to a quantity of subchannels included in the subchannel set 1. For another example, the subchannel set 0 includes the subchannel 0 and the subchannel 1, and the subchannel set 1 includes the subchannel 2 and the subchannel 3. A start identifier of the subchannel set 0 and the subchannel set 1 is a ratio of the identifier of the subchannel 0 to the quantity of subchannels included in the subchannel set 1.

For another example, when the subchannel subindication corresponding to the resource pool i indicates the subchannel set in the resource pool i in a bitmap or another manner, a quantity of bits required to indicate the subchannel in the resource pool i is equal to a quantity of subchannel sets in the resource pool i. For example, the resource pool i includes the subchannel 0, the subchannel 1, the subchannel 2, and the subchannel 3, where the subchannel 0 and the subchannel 1 are the subchannel set 0, and the subchannel 2 and the subchannel 3 are the subchannel set 1. Therefore, a quantity of bits required to indicate subchannels in the resource pool i is 2. For example, 00 is used to indicate the subchannel set 0, 10 is used to indicate the subchannel set 1, and 11 is used to indicate the subchannel set 0 and the subchannel set 1. For example, when the subchannel indication corresponding to the resource pool i is used to indicate the subchannel 0 and the subchannel 1, two bits required to indicate the subchannel set 1 in the resource pool i are 10. If the quantity of bits of the subchannel indication corresponding to the resource pool i is 4, the subchannel subindication corresponding to the resource pool i may be 0010, 1000, or the like.

In some other embodiments, when subchannels indicated by the subchannel indication corresponding to the resource pool i belong to only a same subchannel set, the quantity of bits of the subchannel indication corresponding to the resource pool i may be rounding up log 2(Q), where Q is a quantity of subchannel sets included in the resource pool i. For example, the resource pool i includes the subchannel 0, the subchannel 1, the subchannel 2, and the subchannel 3, where the subchannel 0 and the subchannel 1 are the subchannel set 0, and the subchannel 2 and the subchannel 3 are the subchannel set 1. For example, 0 is used to indicate the subchannel set 0, and 1 is used to indicate the subchannel set 1. For example, when the subchannel indication corresponding to the resource pool i is used to indicate the subchannel 2 and the subchannel 3, one bit required to indicate the subchannel set 1 in the resource pool i is 1. If the quantity of bits of the subchannel indication corresponding to the resource pool i is 2, the subchannel subindication corresponding to the resource pool i may be 10, 01, or the like.

For example, meanings corresponding to the bit value and the bit in this embodiment of this application are merely examples, or there may be another correspondence between values and meanings. This is not specifically limited in this application.

The foregoing description merely uses the subchannel subindication corresponding to the resource pool i as an example, but does not constitute a limitation on the subchannel subindication.

It should be noted that, when the subchannel indication includes the M subchannel subindications, the network device may send the subchannel subindications to the terminal device by using one piece of signaling or a message, or may send the subchannel subindications to the terminal device by using a plurality of pieces of signaling or messages. This is not limited.

In some other embodiments, the quantity of bits of the subchannel indication is determined based on the quantity of subchannels included in the reference resource pool, and the subchannel indication is used to indicate the K subchannels in the M resource pools.

For example, the M resource pools are used as a whole, and the subchannel indication is used to indicate subchannels in the M resource pools. An example in which a quantity of bits required to indicate the K subchannels in the M resource pools is Z, and a quantity of bits of the subchannel indication is Y is used. Y is determined based on the quantity of subchannels included in the reference resource pool. Z and Y are positive integers greater than or equal to 1.

For example, when Z is less than Y, the network device may pad, for the M resource pools, Z bits required to indicate the K subchannels in the M resource pools with (Y−Z) 0s, to obtain the subchannel indication. The network device may send the subchannel indication. The terminal device may receive the subchannel indication sent by the network device. The terminal device may determine, based on the Z bits in the subchannel indication, the K subchannels indicated by the subchannel indication. Specifically, when Z is less than Y, for the M resource pools, the network device may perform zero-padding (zero-padding) on the Z bits required to indicate the K subchannels in the M resource pools, so that a quantity of bits indicating the K subchannels in the M resource pools reaches a quantity Y of bits of the subchannel indication, to obtain the subchannel indication. The network device may send the subchannel indication. The terminal device may receive the subchannel indication sent by the network device. The terminal device may perform interception from a corresponding bit of the subchannel indication until the Z bits are intercepted, and then determine, based on the intercepted Z bits, the K subchannels indicated by the subchannel indication.

For example, when Z is less than Y, the network device may pad the Z bits required to indicate the K subchannels in the M resource pools with (Y−Z) 0s before a most significant bit, to obtain the subchannel indication. The network device may send the subchannel indication. The terminal device may receive the subchannel indication sent by the network device. The terminal device may determine, based on Z least significant bits in the subchannel indication, the K subchannels indicated by the subchannel indication. Specifically, for the M resource pools, the network device pads, in ascending order of bits, starting from a most significant bit, the Z bits required to indicate the K subchannels with 0s, until the quantity of bits indicating the K subchannels reaches Y, to obtain the subchannel indication. The network device may send the subchannel indication. The terminal device may receive the subchannel indication sent by the network device. The terminal device may perform interception, in ascending order of bits, starting from a least significant bit, on the subchannel indication, until the Z bits are intercepted, and then determine, based on the Z bits, the subchannels indicated by the subchannel indication. An example in which the quantity of bits of the subchannel indication is 6, and the quantity of bits required to indicate the K subchannels is 4 is used. If a bit value of the four bits of the K subchannels in the M resource pools is 1101, the subchannel indication is 001101, where two most significant bits of the subchannel indication are padding 0s.

For another example, when Z is less than Y, the network device may pad the Z bits required to indicate the K subchannels in the M resource pools with (Y−Z) 0s after a least significant bit, to obtain the subchannel indication. The network device may send the subchannel indication. The terminal device may receive the subchannel indication sent by the network device. The terminal device may determine, based on Z most significant bits in the subchannel indication, the K subchannels indicated by the subchannel indication. Specifically, for the M resource pools, the network device pads, in descending order of bits, starting from a least significant bit, the Z bits required to indicate the K subchannels with 0s, until the quantity of bits indicating the K subchannels reaches Y, to obtain the subchannel indication. The network device may send the subchannel indication. The terminal device may receive the subchannel indication sent by the network device. The terminal device may perform interception, in descending order of bits, starting from a most significant bit, on the subchannel indication, until the Z bits are intercepted, and then determine, based on the Z bits, the subchannels indicated by the subchannel indication. An example in which the quantity of bits of the subchannel indication is 6, and the quantity of bits required to indicate the K subchannels in the M resource pools is 4 is used. If a bit value of the four bits of the K subchannels in the M resource pools is 1101, the subchannel indication is 110100, where two least significant bits of the subchannel indication are padding 0s.

It should be understood that the foregoing embodiment is merely an example. When Z is less than Y, the terminal device may perform interception starting from a least significant bit of the subchannel indication, may perform interception starting from a most significant bit of the subchannel indication, or may perform interception starting from another bit of the subchannel indication. This is not limited. A specific manner in which the terminal device intercepts, from the subchannel indication, bits that are actually used to indicate the K subchannels in the M resource pools is related to a manner in which the network device performs zero-padding. It should be noted that the manner in which the bits actually used to indicate the K subchannels in the M resource pools are intercepted from the subchannel indication may be notified to the terminal device by the network device or the operator, or may be predefined in a protocol, and so on. This is not limited.

It should be further noted that, in this embodiment of this application, for the network device, when Z is less than Y, for the M resource pools, the network device may pad the Z bits required to indicate the K subchannels in the M resource pools with the (Y−Z) 0s, or may pad the Z bits required to indicate the K subchannels in the M resource pools with (Y−Z) is or other information. This is not limited. Specific information with which the Z bits required to indicate the K subchannels in the M resource pools are padded is predefined in a protocol, or may be indicated by the network device or the operator to the terminal device, and so on.

For another example, when Z is greater than Y, the network device may intercept, for the M resource pools, Y bits from the Z bits required to indicate the K subchannels, to obtain the subchannel indication. The network device may send the subchannel indication. The terminal device may receive the subchannel indication sent by the network device. The terminal device may pad the subchannel indication with (Z−Y) 0s (zero-padding), and then determine the K subchannels based on the subchannel indication padded with the (Z−Y) 0s. Specifically, for the M resource pools, the network device may perform interception, starting from a corresponding bit of bits corresponding to the quantity of bits required to indicate the K subchannels in the M resource pools, until the Y bits are intercepted, to obtain the subchannel indication. The network device may send the subchannel indication. The terminal device may receive the subchannel indication sent by the network device. The terminal device may perform zero-padding (zero-padding) on the subchannel indication, until the quantity of bits of the subchannel indication reaches the quantity Z of bits required to indicate the K subchannels in the M resource pools, and then determine, based on the Z bits obtained after the zero-padding, the K subchannels indicated by the subchannel indication.

For example, when Z is greater than Y, the network device may intercept, for the M resource pools, Y least significant bits from the Z bits required to indicate the K subchannels in the M resource pools, to obtain the subchannel indication. The network device may send the subchannel indication. The terminal device may receive the subchannel indication sent by the network device. The terminal device may pad the subchannel indication with (Z−Y) 0s (zero-padding) before a most significant bit, and then determine, based on the subchannel indication padded with the (Z−Y) 0s, the K subchannels indicated by the subchannel indication. Specifically, for the M resource pools, the network device may perform interception, in ascending order of bits, starting from a least significant bit, on the Z bits required to indicate the K subchannels, until a quantity of bits that are intercepted reaches Y, to obtain the subchannel indication. The network device may send the subchannel indication. The terminal device may receive the subchannel indication sent by the network device. The terminal device may pad, in ascending order of bits, starting from a most significant bit, the subchannel indication with 0s, until the quantity Y of bits of the subchannel indication is increased to the quantity Z of bits required to indicate the K subchannels, and then determine, based on the Z bits that are obtained after the zero-padding and that indicate the K subchannels, the K subchannels indicated by the subchannel indication. The quantity of bits of the subchannel indication is 4, and the quantity of bits required to indicate the K subchannels in the M resource pools is 6. If a bit value of the six bits indicating the K subchannels in the M resource pools is 001101, the subchannel indication is 1101, and a bit value of four least significant bits of the bits required to indicate the K subchannels in the M resource pools is the subchannel indication.

For another example, when Z is greater than Y, the network device may intercept, for the M resource pools, Y most significant bits from the Z bits required to indicate the K subchannels in the M resource pools, to obtain the subchannel indication. The network device may send the subchannel indication. The terminal device may receive the subchannel indication sent by the network device. The terminal device may pad the subchannel indication with (Z−Y) 0s (zero-padding) after a least significant bit, and then determine, based on the subchannel indication padded with the (Z−Y) 0s, the K subchannels indicated by the subchannel indication. Specifically, for the M resource pools, the network device may perform interception, in ascending order of bits, starting from a least significant bit, on the Z bits required to indicate the K subchannels, until a quantity of bits that are intercepted reaches Y, to obtain the subchannel indication. The network device may send the subchannel indication. The terminal device may receive the subchannel indication sent by the network device. The terminal device may pad, in ascending order of bits, starting from a most significant bit, the subchannel indication with 0s, until the quantity Y of bits of the subchannel indication is increased to the quantity Z of bits required to indicate the K subchannels, and then determine, based on the Z bits that are obtained after the zero-padding and that indicate the K subchannels, the K subchannels indicated by the subchannel indication. The quantity of bits of the subchannel indication is 4, and the quantity of bits required to indicate the K subchannels in the M resource pools is 6. If a bit value of the six bits indicating the K subchannels in the M resource pools is 001101, the subchannel indication is 1101, and a bit value of four least significant bits of the bits required to indicate the K subchannels in the M resource pools is the subchannel indication.

It should be understood that the foregoing embodiment is merely an example. When Z is greater than Y, the terminal device may pad the subchannel indication with 0s from a least significant bit, may pad the subchannel indication with 0s from a most significant bit, or may pad the subchannel indication with 0s from another bit. This is not limited. A specific manner in which the terminal device pads the subchannel indication with 0s to obtain a quantity of bits actually required to indicate the subchannel in the resource pool i is related to a manner in which the network device intercepts the subchannel indication from the Z bits required to indicate the K subchannels in the M resource pools. It should be noted that the manner in which the quantity of bits required to be actually used to indicate the K subchannels in the M resource pools are obtained by padding the subchannel indication with 0s may be notified to the terminal device by the network device or the operator, or may be predefined in a protocol, and so on. This is not limited.

It should be further noted that, in this embodiment of this application, for the terminal device, when Z is greater than Y, for the M resource pools, the terminal device may pad the subchannel indication with (Z−Y) 0s, or may pad the subchannel indication with (Z−Y) 1s or other information. This is not limited. Specific information with which the subchannel indication is padded is predefined in a protocol, or may be indicated by the network device or the operator to the terminal device, and so on.

It should be noted that, when the subchannel indication is used as a whole to indicate the subchannels in the M resource pools, the subchannels in the M resource pools may alternatively be indicated using an RIV or in a bitmap manner. In addition, the subchannels in the M resource pools may be alternatively indicated in a subchannel compression manner. For specific implementation, refer to the implementation of the subchannel subindication corresponding to the resource pool i. Details are not described herein again.

In addition, in some other embodiments of this application, the network device further sends a resource pool indication to the terminal device. After receiving the resource pool indication sent by the network device, the terminal device may determine, based on the resource pool indication, resource pools scheduled by the network device for the terminal device. The resource pools indicated by the resource pool indication are the M resource pools to which the K subchannels indicated by the subchannel indication belong.

In some embodiments, a quantity of bits of the resource pool indication may be determined based on the quantity of resource pools corresponding to the BWP used for sidelink communication and/or the quantity M of resource pools to which the subchannels indicated by the subchannel indication belong, may be determined based on the total quantity of resource pools configured in the BWP used for sidelink communication, or may be determined based on the total quantity of resource pools that are configured in the BWP used for sidelink communication and that are in the network device scheduling mode. This is not limited.

Specifically, the resource pool indication may be sent by the network device to the terminal device by using signaling such as higher layer signaling or physical layer signaling (for example, DCI). The resource pool indication and the subchannel indication may be carried in one piece of signaling, or may be carried in different pieces of signaling. This is not limited.

For example, in this embodiment of this application, the resource pool indication may be implemented using an RIV or in a bitmap manner, or the resource pool indication may be implemented in another manner. A manner of implementing the resource pool indication is not limited in this embodiment of this application.

When an RIV is used for indication for the resource pool indication, the quantity of bits of the resource pool indication may be $\log_2(P1*(P1+1)/2)$, where P1 may be the quantity of resource pools corresponding to the BWP used for sidelink communication, may be the quantity of resource pools to which the subchannels indicated by the subchannel indication belong, may be a value determined based on the quantity of resource pools corresponding to the BWP used for sidelink communication and the quantity of resource pools to which the subchannels indicated by the subchannel indication belong, or may be the total quantity of resource pools configured in the BWP used for sidelink communication, the total quantity of resource pools that are configured in the BWP used for sidelink communication and that are in the network device scheduling mode, or the like.

Figure 8:
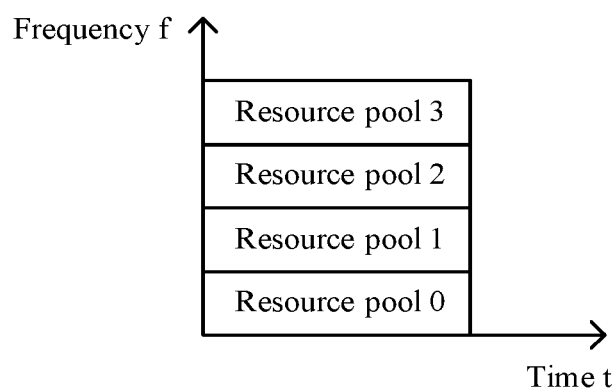
FIG. 8 is a schematic diagram of another resource pool according to an embodiment of this application.

For example, if the M resource pools to which the K subchannels indicated by the subchannel indication belong are consecutive, the resource pool indication may include start identifier information of the M resource pools and resource pool quantity information. The resource pool quantity information is used to indicate the quantity M of resource pools. The resource pool shown in FIG. 8 is used as an example. The K subchannels indicated by the subchannel indication belong to a resource pool 0, a resource pool 1, a resource pool 2, and a resource pool 3 shown in FIG. 8. In this case, the resource pool indication includes resource pool start identifier information and resource pool quantity information, where the resource pool start identifier information is used to indicate that a start resource pool identifier is the resource pool 0, and the resource pool quantity information is used to indicate that a quantity of resource pools is 4.

The resource pool start identifier information may also be referred to as start resource pool information, or a start resource pool identifier, or resource pool start information. The resource pool quantity information may also be referred to as resource pool length information, or a resource pool length.

For example, when the RIV is used, for the resource pool indication, to indicate the M resource pools to which the K subchannels belong, the resource pool start identifier of the M resource pools and the quantity M of resource pools to which the K subchannels belong may be indicated by using the RIV for the resource pool indication, to indicate the M resource pools. In some embodiments, a correspondence between an RIV (resource indication value), a start resource pool identifier of resource pools used for sidelink communication, and a resource pool quantity may be preset. For example, the RIV corresponds to a start resource pool identifier $n_{RP}^{start}$ of the M resource pools, and a resource pool quantity is $L_{RP}$, where $L_{RP} \geq 1$. In this case, when the RIV is used to indicate the M resource pools for the resource pool indication, the RIV corresponds to the start resource pool identifier $n_{RP}^{start}$ of the M resource pools, and the resource pool quantity is $L_{RP}$, where $L_{RP}=M$. In this case, the RIV may satisfy the following expression:

$$RIV = \begin{cases} N_{RP}(L_{RP}-1) + n_{RP}^{start}, & (L_{RP}-1) \leq \lfloor N_{RP}/2 \rfloor \\ N_{RP}(N_{RP}-L_{RP}+1) + (N_{RP}-1-n_{RP}^{start}), & (L_{RP}-1) \leq \lfloor N_{RP}/2 \rfloor \end{cases}$$

$N_{RP}$ is the quantity of resource pools corresponding to the BWP used for sidelink communication. The quantity of resource pools corresponding to the BWP used for sidelink communication may be the total quantity of resource pools configured in the BWP used for sidelink communication, or the total quantity of resource pools that are configured in the BWP used for sidelink communication and that are in the network device scheduling mode or the like. This is not limited.

When a bitmap is used, for the resource pool indication, to indicate the M resource pools, the quantity of bits of the resource pool indication may be P2, where P2 may be the quantity of resource pools corresponding to the BWP used for sidelink communication, may be the quantity of resource pools to which the subchannels indicated by the subchannel indication belong, may be a value determined based on the quantity of resource pools corresponding to the BWP used for sidelink communication and the quantity of resource pools to which the subchannels indicated by the subchannel indication belong, or may be the total quantity of resource pools configured in the BWP used for sidelink communication, or the total quantity of resource pools that are configured in the BWP used for sidelink communication and that are in the network device scheduling mode or the like.

For example, P2 is the total quantity of resource pools configured in the BWP used for sidelink communication. When the total quantity of resource pools configured in the BWP used for sidelink communication is 2, the quantity of bits of the resource pool indication is 2. For example, two resource pools, namely, a resource pool 0 and a resource pool 1, are configured in the BWP used for sidelink communication. Bits in ascending order may be respectively corresponding to resource pool identifiers in ascending order, that is, a least significant bit corresponds to a resource pool identifier 0. For example, when the resource pool indication is 01, the resource pool indication is used to indicate the resource pool 0; when the resource pool indication is 10, the resource pool indication is used to indicate the resource pool 1; when the resource pool indicator is 11, the resource pool indication is used to indicate the resource pool 0 and the resource pool 1. Alternatively, bits in descending order may be respectively corresponding to resource pool identifiers in ascending order, that is, a most significant bit corresponds to a resource pool identifier 0. For example, when the resource pool indication is 01, the resource pool indication is used to indicate the resource pool 1; when the resource pool indication is 10, the resource pool indication is used to indicate the resource pool 0; when the resource pool indicator is 11, the resource pool indication is used to indicate the resource pool 0 and the resource pool 1. For another example, P2 is the total quantity of resource pools configured in the BWP used for sidelink communication. When the total quantity of resource pools configured in the BWP used for sidelink communication is 4, the quantity of bits of the resource pool indication is 4. For example, four resource pools, namely, a resource pool 0, a resource pool 1, a resource pool 2, and a resource pool 3, are configured in the BWP used for sidelink communication, Bits in ascending order may be respectively corresponding to resource pool identifiers in ascending order, that is, a least significant bit corresponds to a resource pool identifier 0. For example, when the resource pool indication is 0001, the resource pool indication is used to indicate the resource pool 0; when the resource pool indication is 0010, the resource pool indication is used to indicate the resource pool 1; when the resource pool indication is 0100, the resource pool indication is used to indicate the resource pool 2; when the resource pool indication is 1000, the resource pool indication is used to indicate the resource pool 3; when the resource pool indication is 0011, the resource pool indication is used to indicate the resource pool 0 and the resource pool 1; when the resource pool indication is 0101, the resource pool indication is used to indicate the resource pool 2 and the resource pool 0; when the resource pool indication is 0111, the resource pool indication is used to indicate the resource pool 2, the resource pool 1, and the resource pool 0; when the resource pool indication is 0110, the resource pool indication is used to indicate the resource pool 2 and the resource pool 1; when the resource pool indication is 1001, the resource pool indication is used to indicate the resource pool 3 and the resource pool 0; when the resource pool indication is 1101, the resource pool indication is used to indicate the resource pool 3, the resource pool 2, and the resource pool 0; when the resource pool indication is 1011, the resource pool indication is used to indicate the resource pool 3, the resource pool 1, and the resource pool 0; when the resource pool indication is 1111, the resource pool indication is used to indicate the resource pool 0, the resource pool 1, the resource pool 2, and the resource pool 3. Alternatively, bits in descending order may be respectively corresponding to resource pool identifiers in ascending order, that is, a most significant bit corresponds to a resource pool identifier 0. For example, when the resource pool indication is 0001, the resource pool indication is used to indicate the resource pool 3; when the resource pool indication is 0010, the resource pool indication is used to indicate the resource pool 2; when the resource pool indication is 0100, the resource pool indication is used to indicate the resource pool 1; when the resource pool indication is 1000, the resource pool indication is used to indicate the resource pool 0; when the resource pool indication is 0011, the resource pool indication is used to indicate the resource pool 2 and the resource pool 3; when the resource pool indication is 0101, the resource pool indication is used to indicate the resource pool 1 and the resource pool 3; when the resource pool indication is 0111, the resource pool indication is used to indicate the resource pool 1, the resource pool 2, and the resource pool 3; when the resource pool indication is 0110, the resource pool indication is used to indicate the resource pool 1 and the resource pool 2; when the resource pool indication is 1001, the resource pool indication is used to indicate the resource pool 0 and the resource pool 3; when the resource pool indication is 1101, the resource pool indication is used to indicate the resource pool 0, the resource pool 1, and the resource pool 3; when the resource pool indication is 1011, the resource pool indication is used to indicate the resource pool 0, the resource pool 2, and the resource pool 3; when the resource pool indication is 1111, the resource pool indication is used to indicate the resource pool 0, the resource pool 1, the resource pool 2, and the resource pool 3.

In addition, in some embodiments, if only one resource pool is indicated by using the resource pool indication, the quantity of bits of the resource pool indication may be $\log_2(P2)$ rounded up, where P2 may be the quantity of resource pools corresponding to the BWP used for sidelink communication, or may be the total quantity of resource pools configured in the BWP used for sidelink communication, or the total quantity of resource pools that are configured in the BWP used for sidelink communication and that are in the network device scheduling mode or the like.

For example, P2 is the total quantity of resource pools configured in the BWP used for sidelink communication. When the total quantity of resource pools configured in the BWP used for sidelink communication is 2, the quantity of bits of the resource pool indication is 1. For example, two resource pools, namely, a resource pool 0 and a resource pool 1, are configured in the BWP used for sidelink communication. For example, when the resource pool indication is 0, the resource pool 0 may be indicated, and when the resource pool indication is 1, the resource pool 1 may be indicated. For example, when the resource pool indication is 1, the resource pool 0 may be indicated, and when the resource pool indication is 0, the resource pool 1 may be indicated. For another example, P2 is the total quantity of resource pools configured in the BWP used for sidelink communication. When the total quantity of resource pools configured in the BWP used for sidelink communication is 4, the quantity of bits of the resource pool indication is 2. For example, four resource pools, namely, a resource pool 0, a resource pool 1, a resource pool 2, and a resource pool 3, are configured in the BWP used for sidelink communication. For example, when the resource pool indication is 00, the resource pool 0 may be indicated, when the resource pool indication is 01, the resource pool 1 may be indicated, when the resource pool indication is 10, the resource pool 2 may be indicated, and when the resource pool indication is 11, the resource pool 3 may be indicated.

The foregoing embodiments may be used separately, or may be used in combination to achieve different technical effects.

In the embodiments provided in this application, the communication method provided in the embodiments of this application is described from a perspective of the terminal device used as an execution body. To implement functions in the communication method provided in the embodiments of this application, the terminal device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint condition of the technical solutions.

Figure 9:
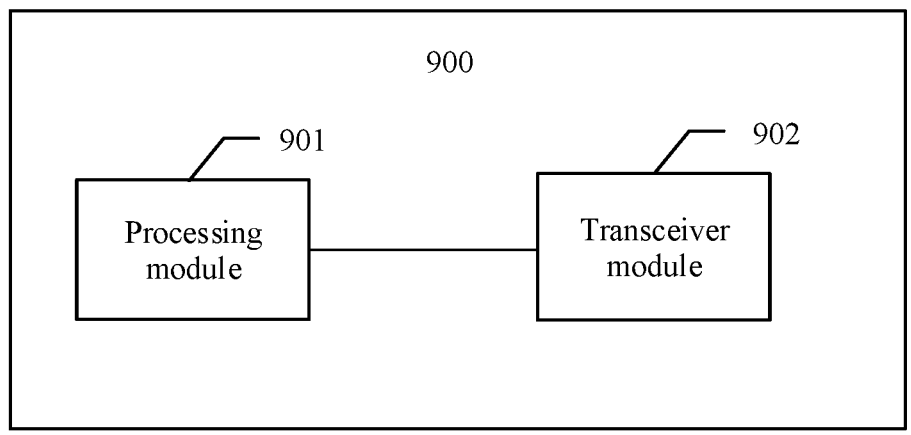
FIG. 9 is a schematic structural diagram of a communication apparatus according to an embodiment of this application.

Same as the foregoing concept, as shown in FIG. 9, an embodiment of this application further provides a communication apparatus 900. The communication apparatus 900 includes a transceiver module 902 and a processing module 901.

In an example, the communication apparatus 900 is configured to implement a function of the terminal device in the foregoing method. The communication apparatus 900 may be the terminal device, or may be an apparatus in the terminal device. The communication apparatus may be a chip system. In this embodiment of this application, the chip system may include a chip, or may include the chip and another discrete component.

The transceiver module 902 is configured to receive a subchannel indication sent by a network device. The processing module 901 is configured to trigger the transceiver module 902 to perform sidelink communication on K subchannels indicated by the subchannel indication. The subchannel indication is used to indicate the K subchannels used for sidelink communication, the K subchannels belong to M resource pools in N resource pools, and the N resource pools are resource pools corresponding to a BWP used for sidelink communication, where N is a positive integer greater than 1, $1 \leq M \leq N$, M is a positive integer, and K is a positive integer greater than or equal to 1. A quantity of bits of the subchannel indication is determined based on a quantity of subchannels included in a reference resource pool, and the reference resource pool is a resource pool in the N resource pools.

In an example, the communication apparatus 900 is configured to implement a function of the network device in the foregoing method. The apparatus may be the network device, or may be an apparatus in the network device. The apparatus may be a chip system. In this embodiment of this application, the chip system may include a chip, or may include the chip and another discrete component.

The processing module 901 is configured to determine K subchannels used for sidelink communication, and the transceiver module 902 is configured to send a subchannel indication to a terminal device, where the K subchannels belong to M resource pools in N resource pools, and the N resource pools are resource pools corresponding to a bandwidth part BWP used for sidelink communication, where N is a positive integer greater than 1, $1 \leq M \leq N$, M is a positive integer, and K is a positive integer greater than or equal to 1; and the subchannel indication is used to indicate the K subchannels used for sidelink communication, a quantity of bits of the subchannel indication is determined based on a quantity of subchannels included in a reference resource pool, and the reference resource pool is a resource pool in the N resource pools.

For a specific execution process of the processing module 901 and the transceiver module 902, refer to the descriptions in the foregoing method embodiments. In the embodiments of this application, division into modules is an example, and is merely logical function division. During actual implementation, there may be another division manner. In addition, in each embodiment of this application, functional modules may be integrated into one processor, or each of the modules may exist alone physically, or two or more modules may be integrated into one module. The integrated module may be implemented in a form of hardware, or may be implemented in a form of a software functional module.

Figure 10:
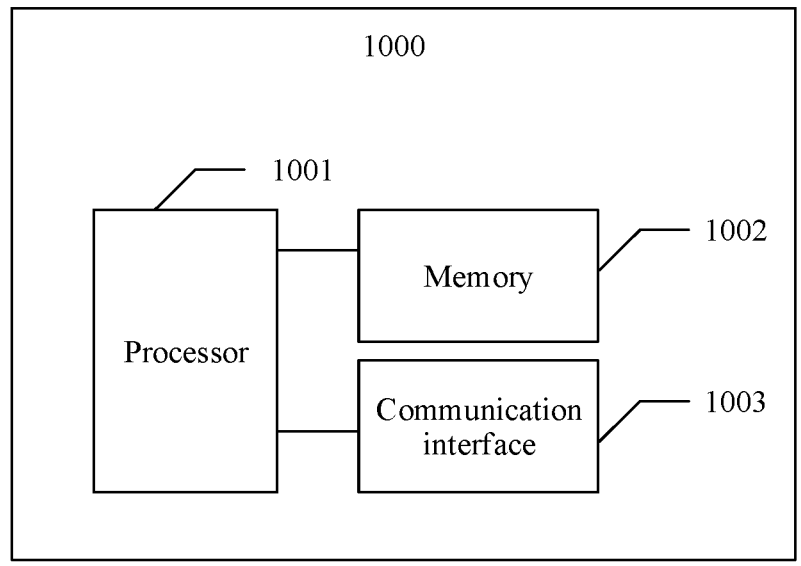
FIG. 10 is a schematic structural diagram of another communication apparatus according to an embodiment of this application.

Same as the foregoing concept, as shown in FIG. 10, an embodiment of this application further provides a communication apparatus 1000.

In an example, the communication apparatus 1000 is configured to implement a function of the terminal device in the foregoing method. The communication apparatus 1000 may be the terminal device, or may be an apparatus in the terminal device. The communication apparatus 1000 includes at least one processor 1001, configured to implement the function of the terminal device in the foregoing method. For example, the processor 1001 may be configured to determine K subchannels based on a subchannel indication. For details, refer to the detailed descriptions in the method. Details are not described herein again.

In some embodiments, the communication apparatus 1000 may further include at least one memory 1002, configured to store program instructions and/or data. The memory 1002 is coupled to the processor 1001. Couplings in the embodiments of this application are indirect couplings or communication connections between apparatuses, units, or modules, may be in an electrical form, a mechanical form, or another form, and are used for information exchange between the apparatuses, the units, or the modules. In another implementation, the memory 1002 may alternatively be located outside the communication apparatus 1000. The processor 1001 may operate in collaboration with the memory 1002. The processor 1001 may execute the program instructions stored in the memory 1002. At least one of the at least one memory may be included in the processor.

In some embodiments, the communication apparatus 1000 may further include a communication interface 1003, configured to communicate with another device through a transmission medium, so that an apparatus in the communication apparatus 1000 may communicate with the another device. For example, the communication interface 1003 may be a transceiver, a circuit, a bus, a module, or another type of communication interface, and the another device may be a network device, another terminal device, or the like. The processor 1001 receives and sends data through the communication interface 1003, and is configured to implement the methods in the foregoing embodiments. For example, the communication interface 1003 may be configured to perform sidelink communication, receive a subchannel indication, and the like.

In an example, the communication apparatus 1000 is configured to implement a function of the network device in the foregoing method. The communication apparatus 1000 may be the network device, or may be an apparatus in the network device. The communication apparatus 1000 includes at least one processor 1001, configured to implement the function of the network device in the foregoing method. For example, the processor 1001 may be configured to obtain the subchannel indication or a subchannel subindication corresponding to a resource pool i, determine K subchannels used for sidelink communication, or the like. For details, refer to the detailed descriptions in the method. Details are not described herein again.

In some embodiments, the communication apparatus 1000 may further include at least one memory 1002, configured to store program instructions and/or data. The memory 1002 is coupled to the processor 1001. Couplings in the embodiments of this application are indirect couplings or communication connections between apparatuses, units, or modules, may be in an electrical form, a mechanical form, or another form, and are used for information exchange between the apparatuses, the units, or the modules. In another implementation, the memory 1002 may alternatively be located outside the communication apparatus 1000. The processor 1001 may operate in collaboration with the memory 1002. The processor 1001 may execute the program instructions stored in the memory 1002. At least one of the at least one memory may be included in the processor.

In some embodiments, the communication apparatus 1000 may further include a communication interface 1003, configured to communicate with another device through a transmission medium, so that an apparatus in the communication apparatus 1000 may communicate with the another device. For example, the communication interface 1003 may be a transceiver, a circuit, a bus, a module, or another type of communication interface, and the another device may be a network device, another terminal device, or the like. The processor 1001 receives and sends data through the communication interface 1003, and is configured to implement the methods in the foregoing embodiments. For example, the communication interface 1003 may send a subchannel indication, a resource pool indication, and the like.

A specific connection medium between the communication interface 1003, the processor 1001, and the memory 1002 is not limited in this embodiment of this application. For example, in FIG. 10, in this embodiment of this application, the memory 1002, the processor 1001, and the communication interface 1003 may be connected by using a bus. The bus may be classified into an address bus, a data bus, a control bus, or the like.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware and a software module that are in the processor.

In the embodiments of this application, the memory may be a nonvolatile memory, for example, a hard disk drive (hard disk drive, HDD) or solid-state drive (solid-state drive, SSD); or may be a volatile memory (volatile memory), for example, a random-access memory (random-access memory, RAM). The memory is any other medium that can carry or store expected program code in a form of instructions or a data structure and that can be accessed by a computer, but is not limited thereto. The memory in the embodiments of this application may alternatively be a circuit or any other apparatus that can implement a storage function, and is configured to store program instructions and/or data.

All or some of the methods provided in the embodiments of this application may be implemented by software, hardware, firmware, or any combination thereof. When software is used to implement the methods, the methods may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of the following claims of this application and their equivalent technologies.

What is claimed is:

1. A communication method, comprising:
  receiving, by a terminal device, a resource pool indication from a network device, the resource pool indication is used to indicate M resource pools to which K subchannels belong, and a quantity of bits of the resource pool indication is determined based on at least one of N and M;
  receiving, by the terminal device, a subchannel indication from the network device, the subchannel indication is used to indicate the K subchannels used for sidelink communication, the K subchannels belong to the M resource pools in the N resource pools, the N resource pools are resource pools corresponding to a bandwidth part (BWP) used for sidelink communication, N is a positive integer greater than 1, $1 \leq M \leq N$, M is a positive integer, K is a positive integer greater than or equal to 1, a quantity of bits of the subchannel indication is determined based on a quantity of subchannels comprised in a reference resource pool, and the reference resource pool is a resource pool in the N resource pools; and
  performing, by the terminal device, the sidelink communication on the K subchannels.

2. The method according to claim 1, wherein the reference resource pool is a resource pool that is in the N resource pools and that is received by the terminal device as an indication from the network device.

3. The method according to claim 1, wherein
  the N resource pools are resource pools corresponding to an overlapping resource between the BWP used for the sidelink communication and a BWP used for uplink communication, or
  the N resource pools are resource pools corresponding to a resource that is in the BWP used for the sidelink communication and that is used in a network device scheduling mode.

4. The method according to claim 1, wherein the resource pool indication is received, from the network device, by the terminal device via downlink control information, and
  wherein the resource pool indication and the subchannel indication are carried in one piece of signaling.

5. The method according to claim 1, wherein the quantity of bits of the resource pool indication meet log 2(P2) rounded up, where P2 is a total quantity of resource pools that are configured in the BWP used for the sidelink communication and that are in the network device scheduling mode.

6. A communication apparatus, comprising:
  a memory storing program instructions; and
  a processor coupled to the memory, wherein the processor is configured to execute the program instructions to cause the communication apparatus to:
    receive a resource pool indication from a network device, wherein the resource pool indication is used to indicate M resource pools to which K subchannels belong, and a quantity of bits of the resource pool indication is determined based on at least one of N and M;
    receive a subchannel indication from the network device, the subchannel indication is used to indicate the K subchannels used for sidelink communication, the K subchannels belong to the M resource pools in the N resource pools, the N resource pools are resource pools corresponding to a bandwidth part (BWP) used for sidelink communication, N is a positive integer greater than 1, $1 \leq M \leq N$, M is a positive integer, K is a positive integer greater than or equal to 1, a quantity of bits of the subchannel indication is determined based on a quantity of subchannels comprised in a reference resource pool, and the reference resource pool is a resource pool in the N resource pools; and
    perform the sidelink communication on the K subchannels.

7. The communication apparatus according to claim 6, wherein the reference resource pool is a resource pool that is in the N resource pools and that is received by the apparatus as an indication from the network device.

8. The communication apparatus according to claim 6, wherein
the N resource pools are resource pools corresponding to an overlapping resource between the BWP used for the sidelink communication and a BWP used for uplink communication, or
the N resource pools are resource pools corresponding to a resource that is in the BWP used for the sidelink communication and that is used in a network device scheduling mode.

9. The communication apparatus according to claim 6, wherein the resource pool indication is received, from the network device, by the communication apparatus via downlink control information, and
wherein the resource pool indication and the subchannel indication are carried in one piece of signaling.

10. The communication apparatus according to claim 6, wherein the quantity of bits of the resource pool indication meet log 2(P2) rounded up, where P2 is the total quantity of resource pools that are configured in the BWP used for the sidelink communication and that are in the network device scheduling mode.

11. A communication apparatus, comprising:
a memory storing program instructions; and
a processor coupled to the memory, wherein the processor is configured to execute the program instructions to cause the apparatus to:
determine K subchannels used for sidelink communication, the K subchannels belong to M resource pools in N resource pools, the N resource pools are resource pools corresponding to a bandwidth part (BWP) used for sidelink communication, N is a positive integer greater than 1, $1 \leq M \leq N$, M is a positive integer, and K is a positive integer greater than or equal to 1;
send a resource pool indication to a terminal device, the resource pool indication is used to indicate the M resource pools to which the K subchannels belong, and a quantity of bits of the resource pool indication is determined based on at least one of N and M; and
send a subchannel indication to a terminal device, the subchannel indication is used to indicate the K subchannels used for the sidelink communication, a quantity of bits of the subchannel indication is determined based on a quantity of subchannels comprised in a reference resource pool, and the reference resource pool is a resource pool in the N resource pools.

12. The communication apparatus according to claim 11, wherein the reference resource pool is a resource pool that is in the N resource pools and that is indicated by the communication apparatus to the terminal device.

13. The communication apparatus according to claim 11, wherein
the N resource pools are resource pools corresponding to an overlapping resource between the BWP used for the sidelink communication and a BWP used for uplink communication, or
the N resource pools are resource pools corresponding to a resource that is in the BWP used for the sidelink communication and that is used in a network device scheduling mode.

14. The communication apparatus according to claim 11, wherein the resource pool indication is sent by the communication apparatus to the terminal device by using downlink control information, and
wherein the resource pool indication and the subchannel indication are carried in one piece of signaling.

15. The communication apparatus according to claim 11, wherein the quantity of bits of the resource pool indication meet log 2(P2) rounded up, where P2 is the total quantity of resource pools that are configured in the BWP used for the sidelink communication and that are in the network device scheduling mode.

* * * * *